(12) United States Patent
Plewnia et al.

(10) Patent No.: US 11,014,545 B2
(45) Date of Patent: May 25, 2021

(54) HYDRAULIC BRAKE SYSTEM FOR A MOTOR VEHICLE AND METHOD FOR OPERATING AND TESTING SAME

(71) Applicant: Lucas Automotive GmbH, Koblenz (DE)

(72) Inventors: Heinrich Plewnia, Niederhofen (DE); Nicholas Alford, Waldesch (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 129 days.

(21) Appl. No.: 16/479,310

(22) PCT Filed: Jan. 19, 2018

(86) PCT No.: PCT/EP2018/051261
§ 371 (c)(1),
(2) Date: Jul. 19, 2019

(87) PCT Pub. No.: WO2018/134333
PCT Pub. Date: Jul. 26, 2018

(65) Prior Publication Data
US 2020/0070797 A1    Mar. 5, 2020

(30) Foreign Application Priority Data

Jan. 19, 2017 (DE) .......................... 102017000472.2

(51) Int. Cl.
*B60T 13/68* (2006.01)
*B60T 15/04* (2006.01)

(52) U.S. Cl.
CPC ....... *B60T 15/041* (2013.01); *B60T 2270/404* (2013.01); *B60T 2270/413* (2013.01)

(58) Field of Classification Search
CPC .... B60T 15/041; B60T 13/686; B60T 13/662; B60T 13/146; B60T 2270/404; B60T 2270/413; B60T 2270/402
See application file for complete search history.

(56) References Cited

U.S. PATENT DOCUMENTS 5,655,819 A    8/1997  Emig et al.
9,776,607 B2 * 10/2017 Brenn ................. B60T 7/042
(Continued)

FOREIGN PATENT DOCUMENTS

WO    2012017037    2/2012
WO    2016012331    1/2016

*Primary Examiner* — Thomas W Irvin
(74) *Attorney, Agent, or Firm* — Tarolli, Sundheim, Covell & Tummino LLP

(57) ABSTRACT

A hydraulic brake system for a motor vehicle with redundant braking pressure regulation is presented. The brake system comprises a first functional unit having at least one first electrical braking pressure generator which is designed to generate a braking pressure at each of a plurality of wheel brakes, and further having a valve assembly per wheel brake. The valve assembly can be actuated for braking pressure regulation at the corresponding wheel brake in order to couple a first wheel brake associated with the valve assembly either to the first braking pressure generator or to an unpressurized reservoir for hydraulic fluid. The brake system also comprises a second functional unit having at least one second electrical braking pressure generator which is designed to generate a braking pressure at each of a subset of the wheel brakes. The output of the second braking pressure generator is arranged downstream, as seen from the first braking pressure generator, of the valve assembly associated with the corresponding wheel brake. The second functional unit is also designed to perform braking pressure regulation at each wheel brake of the subset redundantly in relation to the first functional unit.

33 Claims, 12 Drawing Sheets

(56) References Cited

U.S. PATENT DOCUMENTS

| | | |
|---|---|---|
| 10,220,822 B2 | 3/2019 | Linhoff et al. |
| 10,358,119 B2 | 7/2019 | Besier et al. |
| 10,391,994 B2 | 8/2019 | Drumm et al. |
| 10,703,347 B2* | 7/2020 | Besier ................... B60T 8/4872 |
| 10,752,228 B2* | 8/2020 | Peichl ................... B60T 13/165 |
| 2016/0214582 A1 | 7/2016 | Brenn et al. |
| 2016/0339885 A1 | 11/2016 | Linhoff et al. |
| 2017/0129469 A1 | 5/2017 | Besier et al. |
| 2017/0282877 A1 | 10/2017 | Besier et al. |
| 2019/0039583 A1* | 2/2019 | Besier ..................... B60T 8/321 |
| 2019/0241167 A1* | 8/2019 | Peichl ................... B60T 13/165 |
| 2019/0366997 A1* | 12/2019 | Jeong ................... B60T 8/4081 |
| 2020/0139949 A1* | 5/2020 | Dolmaya ................ B60T 7/042 |
| 2020/0172067 A1* | 6/2020 | Einig ...................... B60T 8/409 |
| 2020/0207320 A1* | 7/2020 | Plewnia ............... B60T 13/745 |
| 2020/0207321 A1* | 7/2020 | Plewnia .................. B60T 7/042 |
| 2020/0361439 A1* | 11/2020 | Neu .......................... B60T 8/90 |

* cited by examiner

HYDRAULIC BRAKE SYSTEM FOR A MOTOR VEHICLE AND METHOD FOR OPERATING AND TESTING SAME

RELATED APPLICATION

This application this application corresponds to PCT/EP2018/051261, filed Jan. 19, 2018, which corresponds to German Application No. 10 2017 000 472.2, filed Jan. 19, 2017, the subject matter of which are incorporated herein by reference in their entirety.

TECHNICAL FIELD

The present disclosure relates generally to the field of motor vehicle brake systems. Specifically, a hydraulic brake system for a motor vehicle and method for operating and testing the same are described.

BACKGROUND

Conventional motor vehicle electrohydraulic brake systems according to the brake-by-wire (BBW) principle comprise an electrical braking pressure generator, which in normal braking operation generates the braking pressure at the wheel brakes of the motor vehicle. A vehicle deceleration requested by the driver at a brake pedal is detected by sensor in this case and converted into a control signal for the electrical braking pressure generator.

In order to be able to still build up a braking pressure at the wheel brakes in the event of failure of the electrical braking pressure generator, brake systems according to the BBW principle usually comprise a master cylinder in addition, via which hydraulic fluid can likewise be conveyed to the wheel brakes. In normal braking operation the brake pedal is decoupled from the master cylinder, wherein a braking pressure is built up at the wheel brakes exclusively by means of the electrical braking pressure generator. In emergency braking operation, on the other hand, thus if the electrical braking pressure generator fails, for example, the decoupling of brake pedal and master cylinder is cancelled. In this case the driver can then generate a braking pressure at the wheel brakes himself by means of the brake pedal then acting on the master cylinder.

Emergency braking operation is also termed push-through (PT) operation on account of the cancelled decoupling of brake pedal and master cylinder. The opportunity granted to the driver of being able to build up a braking pressure at the wheel brakes via the master cylinder in PT operation creates a redundancy that is indispensable with respect to safety considerations.

Motor vehicle brake systems for autonomous or semi-autonomous driving must also be designed redundantly. However, it cannot be assumed in such cases that the driver is located in the vehicle (e.g. in remote controlled parking, RCP, mode) or that the driver can immediately actuate a brake pedal for PT operation (e.g. when looking away from the traffic situation).

It is required for this reason that, as well as a functional unit that provides an electrically actuatable main braking function, brake systems for autonomous or semi-autonomous driving comprise another functional unit, which implements an electrically actuatable auxiliary braking function in a redundant manner.

SUMMARY

The present disclosure is based on the object of specifying a hydraulic brake system for a motor vehicle that comprises two electrical braking pressure generators in a redundant manner.

According to a first aspect, a hydraulic brake system for a motor vehicle with redundant braking pressure regulation is specified, wherein the brake system comprises a first functional unit with at least one first electrical braking pressure generator, which is formed to generate a braking pressure at each of a plurality of wheel brakes, and with a first valve arrangement per wheel brake, wherein the first valve arrangement can be actuated for braking pressure regulation at the corresponding wheel brake, in order to couple a wheel brake associated with the first valve arrangement selectively to the first braking pressure generator or to a first unpressurised reservoir for hydraulic fluid. The motor vehicle brake system further comprises a second functional unit with at least one second electrical braking pressure generator, which is formed to generate a braking pressure at each of a subset of the wheel brakes, wherein an output of the second braking pressure generator is arranged downstream, as seen from the first braking pressure generator, of the first valve arrangement associated with the corresponding wheel brake. The second functional unit is designed to carry out braking pressure regulation at each wheel brake of the subset in a redundant manner in relation to the first functional unit.

The output of the second braking pressure generator can be arranged in such a manner that the second braking pressure generator can generate a braking pressure at the subset of wheel brakes in addition or alternatively to the first braking pressure generator. In particular, the second braking pressure generator can take over braking pressure generation at the subset of wheel brakes following a failure of the first braking pressure generator. The hydraulic fluid required for this can be taken by the second braking pressure generator from a hydraulic fluid reservoir that is locally available only to the second functional unit or from a central reservoir that is available also to the first functional unit.

The second functional unit can be designed in particular to carry out in a redundant manner one, more or all braking pressure regulating functions that the first functional unit is able to carry out. This redundancy created by means of the second functional unit can be activated in the event of a fault in the first functional unit, for example. Examples of braking pressure regulating functions comprise one or more of the following functions: anti-lock braking system, traction control system, vehicle dynamics control and automatic proximity control.

The subset of wheel brakes at which the second electrical braking pressure generator can generate a braking pressure can be a proper subset or an improper subset of the plurality of wheel brakes at which the first electrical braking pressure generator can generate a braking pressure. In the case of an improper subset, the second electrical braking pressure generator can generate a braking pressure at all wheel brakes at which the first electrical braking pressure generator can also generate a braking pressure.

The two functional units can be separated from one another logically and/or physically. Functional units that are physically separated from one another can be accommodated at least to the extent of some of their components in different housings or housing parts. The different housings or housing parts can be attached to one another directly, thus at least approximately without any gap, and can thus be regarded as two sub-housings of a higher-level overall housing.

According to a first variant, both an input of the first braking pressure generator and an input of the second braking pressure generator is or can be coupled to the first unpressurised reservoir. In this case both braking pressure generators can draw in hydraulic fluid from the first reservoir.

According to another variant, the second functional unit comprises a second unpressurised reservoir for hydraulic fluid, wherein an input of the second braking pressure generator is or can be coupled to the second unpressurised reservoir. An input of the first braking pressure generator is or can be coupled to the first unpressurised reservoir, on the other hand.

For carrying out braking pressure regulation, the second functional unit can further comprise a second valve arrangement per wheel brake of the subset. The second valve arrangement can be actuatable for braking pressure regulation at the pertinent wheel brake. The pertinent actuation can in particular be directly accompanied by the build-up, maintenance or reduction of a braking pressure at the pertinent wheel brake.

The second valve arrangement can be provided between the output of the second braking pressure generator and the second unpressurised reservoir. According to this approach, the second valve arrangement can assume its forward direction in the electrically non-actuated state and in the actuated state have a blocking effect at least in the direction of the second unpressurised reservoir.

The second valve arrangement can comprise a first valve unit, in order to couple the wheel brake associated with the second valve arrangement selectively to the second pressure generator to increase the braking pressure, and a second valve unit, in order selectively to reduce braking pressure at the wheel brake associated with the second valve arrangement. The braking pressure reduction can take place by releasing hydraulic fluid into the first unpressurised reservoir, the second unpressurised reservoir or a fluid pressure accumulator.

The first valve unit can assume a forward position in its electrically non-actuated state. The second valve unit can have a blocking effect in its electrically non-actuated state at least in the direction of a fluid reservoir (for example, the first unpressurised reservoir or a hydraulic pressure accumulator).

In one variant, the second electrical braking pressure generator is arranged in a fluid line between the first valve arrangement associated with a wheel brake and the corresponding wheel brake. In particular, the second electrical braking pressure generator can be arranged in such a manner that the output of the second electrical braking pressure generator is directed towards the wheel brake and an input or the input of the second electrical braking pressure generator is directed towards the corresponding first valve arrangement. In this case the second electrical braking pressure generator can be formed to draw in hydraulic fluid from or via the first functional unit.

Furthermore, the second valve arrangement associated with the corresponding wheel brake can comprise a first valve unit connected in parallel to the second braking pressure generator. The first valve unit can assume its forward position in its electrically non-actuated state. In its electrically actuated state the second valve arrangement can have a blocking effect. Furthermore, the second valve arrangement associated with the corresponding wheel brake can comprise a second valve unit connected in parallel to the first valve unit. The second valve unit can also assume a forward position in its electrically non-actuated state and develop a blocking effect when electrically actuated. The first, and if present, the second valve unit can be designed to assume a forward position during operation of the first braking pressure generator. During operation of the second braking pressure generator they can assume a blocking position at least opposite to a conveying direction of the second braking pressure generator.

The wheel brakes can comprise front wheel brakes and rear wheel brakes. In one variant the front wheel brakes are connected to the second functional unit and the rear wheel brakes are connected to the first functional unit. In another variant all wheel brakes are connected to the second functional unit.

The second functional unit can generally comprise at least one fluid reservoir provided on the input side of the second braking pressure generator. The fluid reservoir can be formed as a fluid pressure accumulator (e.g. as a diaphragm accumulator or as a spring-loaded piston accumulator), in order to store hydraulic fluid under pressure. Alternatively to this, the fluid reservoir can be formed without the possibility of putting hydraulic fluid under pressure.

According to one variant, a fluid reservoir is provided for each front wheel brake in the second functional unit, and no piston accumulator is provided for the rear wheel brakes in the second functional unit. According to another variant, fluid reservoirs are provided in the second functional unit both for the front wheel brakes and for the rear wheel brakes. Precisely one fluid reservoir can be provided per front wheel brake and/or per rear wheel brake.

According to one variant, the fluid reservoir is formed as a piston accumulator with a cylinder and a piston taken up movably therein, wherein the piston has a storage position when the cylinder is filled. If hydraulic fluid is removed from the filled cylinder, the piston moves out of its storage position. The piston can be acted upon by atmospheric pressure.

The piston accumulator can be arranged in a fluid path between one of the wheel brakes of the subset and the first functional unit in such a manner that a hydraulic fluid flowing from the wheel brake in the direction of the first functional unit can push the piston into its storage position. The corresponding fluid path can thus run through the cylinder of the piston accumulator, wherein opening of the fluid path to the first functional unit takes place only following movement of the piston into its storage position.

A first non-return valve can be provided between the cylinder and the first functional unit, which permits a flow of hydraulic fluid into the first functional unit. In the opposite direction, on the other hand, the first non-return valve has a blocking effect. The first non-return valve can be spring-loaded. An opening pressure for opening the first non-return valve can be less than 1 bar, in particular less than 0.5 bar.

The motor vehicle brake system can comprise a second non-return valve, which permits hydraulic fluid to be drawn in by means of the second braking pressure generator from or via the first functional unit. In the opposite direction, on the other hand, the second non-return valve acts in a blocking manner.

In one variant the second non-return valve is provided between the cylinder and the first functional unit in such a way that aspiration of hydraulic fluid is possible by means of the second braking pressure generator from the first functional unit and through the cylinder. In this case the first non-return valve and the second non-return valve can be arranged in lines communicating with the cylinder that are offset to one another. The line associated with the first non-return valve can be released substantially only in the storage position of the piston when the cylinder is full. The line associated with the second non-return valve can be released substantially independently of the position of the piston.

The piston accumulator can be formed without an elastic element for automatic transfer of the piston to its storage position. As mentioned above, in this case the transfer of the piston to its storage position can be accomplished by means of the hydraulic fluid flowing back from the wheel brake into the cylinder in the direction of the first functional unit.

The second functional unit can further comprise a separating piston arrangement. The separating piston arrangement can be arranged between the output of the second braking pressure generator and the corresponding wheel brake of the subset. In one variant, two hydraulic systems separated from one another for the first functional unit and the second functional unit can be defined by means of the separating piston arrangement.

The separating piston arrangement can be formed to couple the first braking pressure generator fluidically in its operation to the corresponding wheel brake of the subset. The separating piston arrangement can also be formed to uncouple the first braking pressure generator from the corresponding wheel brake fluidically during operation of the second braking pressure generator.

The first functional unit can further comprise a first control device for actuating the first braking pressure generator (and, as an option, one or more valve units of the first valve arrangement) during braking pressure regulation of the first functional unit. The second functional unit can correspondingly comprise a second control device, which is formed for actuating the second braking pressure generator (and, as an option, one or more valve units of the second valve arrangement) during braking pressure regulation of the second functional unit. As an alternative to this, a common control device can be provided for the first functional unit and the second functional unit.

Each first valve arrangement can comprise a third valve unit, in order to couple the wheel brake associated with the first valve arrangement selectively to the first braking pressure generator. Furthermore, each first valve arrangement can have a fourth valve unit, in order selectively to reduce braking pressure at the wheel brake associated with the second valve arrangement (e.g. into the first unpressurised reservoir, the second unpressurised reservoir or a fluid pressure accumulator).

The first functional unit can further comprise a brake cylinder that can be coupled to a brake pedal. Furthermore, the first functional unit can be provided with a changeover device, in order to couple selectively the first braking pressure generator or the master cylinder to at least one of the wheel brakes.

According to one variant, the subset of the wheel brakes is associated exclusively with the front wheels of the motor vehicle. In this variant the wheel brakes of the rear wheels are not covered by the subset of the wheel brakes.

The first braking pressure generator can comprise a double-acting cylinder-piston arrangement (e.g. in the manner of a plunger arrangement), which is actuatable by means of an electric motor. Instead of a double-acting cylinder-piston arrangement, a single-acting cylinder-piston arrangement (e.g. in the manner of a plunger arrangement), a gear type pump or a multi-piston pump can be provided.

The second functional unit can be formed in such a manner that the second braking pressure generator can implement a build-up of braking pressure at all wheel brakes of the motor vehicle. The braking pressure build-up can take place in particular in connection with braking pressure regulation.

The second braking pressure generator can comprise a multi-piston pump. At least one piston of the multi-piston pump can be associated with each of the wheel brakes, wherein a single piston or single set of several pistons can be associated jointly with several wheel brakes. The multi-piston pump can comprise two, three, four, six or more pistons.

As an example, the multi-piston pump comprises at least four pistons. If the brake system comprises two front wheel brakes and two rear wheel brakes, at least one of these four pistons can be associated with each front wheel brake and each rear wheel brake. With a six-piston pump, precisely two pistons can be associated accordingly with each front wheel brake, wherein precisely one piston is associated with each rear wheel brake. The two front wheel brakes and the two rear wheel brakes can be connected in this case to the second functional unit.

A separate fluid path extending between the first functional unit and the second functional unit can be provided per wheel brake. In a brake system with two front wheel brakes and two rear wheel brakes, four fluid paths can thus extend between the first functional unit and the second functional unit. According to one variant, the fluid paths permit a build-up of braking pressure at the individual wheel brakes by means of the first braking pressure generator. In addition or alternatively to this, the fluid paths can permit aspiration of hydraulic fluid by means of the second braking pressure generator from or via the first functional unit.

In one variant the multi-piston pump comprises at least three pistons. In a brake system with two front wheel brakes and two rear wheel brakes, at least one piston can thus be associated with each front wheel brake. At least one piston can be associated jointly with the two rear wheel brakes. In a six-piston pump, precisely two pistons can be associated with each front wheel brake, wherein two pistons can likewise jointly be associated with the two rear wheel brakes.

In this case or also in another configuration of the second braking pressure generator (e.g. as a central plunger arrangement) the two front wheel brakes can be connected to the second functional unit and the two rear wheel brakes to the first functional unit. A separate fluid path extending between the first functional unit and the second functional unit can be provided here per front wheel brake and for the rear wheel brakes a common fluid path can be provided extending between the first functional unit and the second functional unit. Alternatively to this, a separate fluid path extending between the first functional unit and the second functional unit can be provided per front wheel brake, while the at least one piston associated commonly with the two rear wheel brakes can convey hydraulic fluid to the first functional unit in at least one of these fluid paths. In the last-named case, another valve unit can also be provided, which in its blocking position prevents hydraulic fluid conveyed via the fluid path to the first functional unit from being able to get to the front wheel brakes or on the input side to a fluid reservoir associated with the rear wheel brakes.

According to a second aspect, a method for operating a hydraulic brake system for a motor vehicle is specified. The brake system comprises a first functional unit with at least one first electrical braking pressure generator, which is formed to generate a braking pressure at each of a plurality of wheel brakes, and with a first valve arrangement per wheel brake, wherein the first valve arrangement is actuatable for braking pressure regulation at the corresponding wheel brake, in order to couple a wheel brake associated with the first valve arrangement selectively to the first braking pressure generator or to an unpressurised reservoir for hydraulic fluid. The brake system further comprises a second functional unit with at least one second electrical braking pressure generator, which is formed to generate a braking pressure at each of a subset of the wheel brakes, wherein an output of the second braking pressure generator is arranged downstream, as seen from the first braking pressure generator, of the first valve arrangement associated with the corresponding wheel brake. The method comprises the steps of identifying a requirement for braking pressure regulation in the event of a lack of functionality of the first functional unit and on identification of this, carrying out braking pressure regulation by the second functional unit of at least one wheel brake of the subset.

Identifying a requirement for braking pressure regulation and identifying a lack of functionality of the first functional unit can be steps separate from one another, which are executed in any sequence. According to another variant, a lack of functionality of the first functional unit itself constitutes the requirement for braking pressure regulation.

Likewise specified is a method for testing the second functional unit of the electrohydraulic motor vehicle brake system specified here. The method comprises the steps of hydraulic uncoupling of the second functional unit from the first functional unit (for example, by means of one or more suitable valves), actuation of the second pressure generator to build up a hydraulic pressure at least at one wheel brake of the subset, determination of one or more of the following parameters: a hydraulic pressure generated at the corresponding wheel brake and a filling level of an unpressurised reservoir for hydraulic fluid associated with the second functional unit, and testing of the functionality of the second functional unit on the basis of the at least one parameter determined.

Each of the methods can comprise one or more other steps, as described above and below.

Furthermore, a computer program product is specified, which comprises program code for carrying out the method presented here when the program code is executed on a motor vehicle control device.

A motor vehicle control device or control device system (of a number of control devices) is likewise specified, wherein the control device or control device system comprises at least one processor and at least one memory and wherein the memory comprises program code which, when it is executed by the processor, causes the execution of the steps of one of the methods specified here.

BRIEF DESCRIPTION OF THE DRAWINGS

Further aspects, details and advantages of the present disclosure result from the following description of exemplary embodiments with reference to the figures. In these.

DETAILED DESCRIPTION

Figure 1:
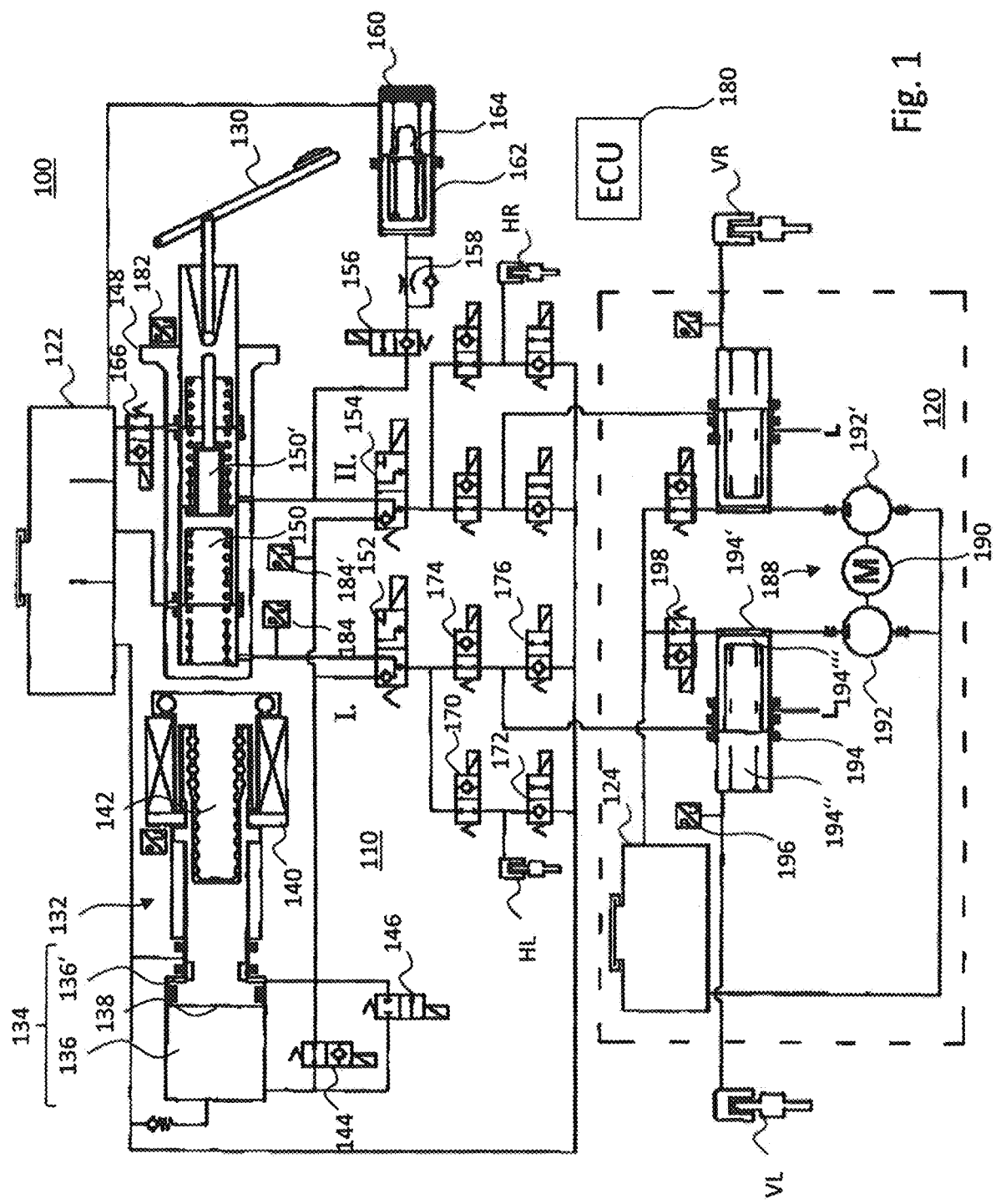
FIGS. 1-12 show various exemplary embodiments of a hydraulic motor vehicle brake system.

FIG. 1 shows the hydraulic circuit diagram of a first exemplary embodiment of a hydraulic motor vehicle brake system 100 according to the BBW principle. The brake system 100 is formed to be suitable also for autonomous or semi-autonomous driving operation.

As shown in FIG. 1, the brake system 100 comprises a first functional unit 110, which provides an electrically actuatable main brake function, and a second functional unit 120, which implements an electrically actuatable auxiliary brake function in a redundant manner. While the first functional unit 110 is formed to build up a braking pressure at all four wheel brakes VL, VR, HL, HR of the motor vehicle, the second functional unit 120 is formed to build up a braking pressure only at the two wheel brakes VL, VR of the front wheels. In alternative exemplary embodiments the second functional unit 120 could be formed to build up a braking pressure only at the two wheel brakes of the rear wheels HL, HR, at all four wheel brakes VL, VR, HL, HR or at two diagonally opposing wheel brakes VL/HR or VR/HL.

The first functional unit 110 is designed to carry out wheel braking pressure regulation decoupled from a driver's braking desire at one or more of the wheel brakes VL, VR, HL, HR. The second functional unit 120 can take over at least some wheel braking pressure regulating functions of the first functional unit 110 in a redundant manner at the wheel brakes VL and VR.

The two functional units 110, 120 can be accommodated as separate modules in separate housing blocks. Depending on the requirement, the first functional unit 110 can thus be installed either alone or in combination with the second functional unit 120.

Referring to FIG. 1, the brake system 100 operates by means of a hydraulic fluid, which is stored partly in two unpressurised reservoirs 122, 124. While the first unpressurised reservoir 122 is associated with the first functional unit 110, the second unpressurised reservoir 124 is associated with the second functional unit 120. The first reservoir 122 has a greater capacity than the second reservoir 124. The volume of the hydraulic fluid stored in the second reservoir 124 is at least sufficient, however, to be able to bring the vehicle safely to a stop even in the event of required braking pressure regulation at one or more of the wheel brakes VL and VR. In this case the additional hydraulic volume required to compensate for brake wear (e.g. on the brake pads) is provided not by the second reservoir 124, but by the first reservoir 122.

Braking pressures at the wheel brakes VL, VR, HL, HR can be generated by means of the first functional unit 110 and the second functional unit 120 independently of one another by pressurising hydraulic fluid.

For autonomous and semi-autonomous braking pressure generation or braking pressure generation requested by the driver at a brake pedal 130 in BBW operation, the first functional unit 110 comprises a first electrical braking pressure generator 132. This braking pressure generator 132 comprises a double-acting cylinder-piston arrangement 134 according to the plunger principle with two cylinder chambers 136, 136' and a piston 138 movable therein. The piston 138 of the braking pressure generator 132 is driven by an electric motor 140 via a transmission 142. In the exemplary embodiment, the transmission 142 is formed to convert a rotational movement of the electric motor 140 into a translatory movement of the piston 138.

The cylinder chambers 136, 136' can be coupled both to the reservoir 122 and to two brake circuits I. and II., wherein each brake circuit I. and II. in turn supplies two wheel brakes VL, HL and VR, HR. A different allocation of the four wheel brakes VL, VR, HL, HR to the two brake circuits I. and II. is also possible (e.g. a diagonal division).

In the present exemplary embodiment, two valves 144, 146, which are actuated by electromagnets and connected parallel to one another, are associated with the electrical braking pressure generator 132, in order to connect one of the chambers 136, 136' in each case fluidically to the two brake circuits I. and II. according to the principle of double action, while the other chamber draws in hydraulic fluid from the reservoir 122. In the unactuated, thus electrically non-actuated state, the valves 144, 146 assume the basic positions depicted in FIG. 1. This means that the valve 144 assumes its throughflow position and the valve 146 assumes its blocking position, so that in the case of a forward stroke (to the left in FIG. 1), the piston 138 displaces hydraulic fluid from the chamber 136 on the front side into the two brake circuits I. and II. In order to displace hydraulic fluid from the chamber 136' on the rear side into the two brake circuits I. and II. in a return stroke (to the right in FIG. 1) of the piston 138, only the valve 144 is actuated, thus transferred to its blocking position. The optional valve 146 can be actuated in connection with venting or other steps.

To generate braking pressure in PT mode, the first functional unit 110 further comprises a master cylinder 148, which is to be actuated by the driver through the pedal 130. The master cylinder 148 in turn comprises two chambers 150, 150', wherein the first chamber 150 is coupled to the first brake circuit I. and the second chamber 150' is coupled to the second brake circuit II.

Starting out from the master cylinder 148, the two brake circuits I. and II. can be supplied with pressurised hydraulic fluid in a redundant manner in relation to the electrical braking pressure generator 132. Two valves 152, 154 actuated by electromagnets are provided for this purpose, which assume the basic positions depicted in FIG. 1 in the unactuated, thus electrically non-actuated state. In these basic positions the valves 152, 154 couple the master cylinder 148 to the wheel brakes VL, VR, HL, HR. Thus even in the event of the energy supply failing (and an accompanying failure of the electrical braking pressure generator 132), a hydraulic pressure can still be built up by the driver at the wheel brakes VL, VR, HL, HR by means of the brake pedal 130 then acting on the master cylinder 148 (PT operation).

In BBW mode, the valves 152, 154 are connected in such a way, on the other hand, that the master cylinder 148 is decoupled fluidically from the two brake circuits I. and II., while the electrical braking pressure generator 132 is coupled to the brake circuits I. and II. When the master cylinder 148 is decoupled from the brake circuits I. and II., the hydraulic fluid displaced from the master cylinder 148 when the brake pedal 130 is actuated is thus conveyed not into the brake circuits I. and II., but via a 2/2-way valve 156 actuated by an electromagnet and a throttle device 158 into a simulator 160. In its electrically non-actuated basic position in BBW mode the valve 156 assumes the position depicted in FIG. 1, in which the master cylinder 148 is uncoupled from the simulator 160, so that hydraulic fluid can be conveyed into the brake circuits I. and II.

The simulator 160 is provided to communicate to the driver the familiar pedal response behaviour when the master cylinder 148 is hydraulically uncoupled from the brake circuits I. and II. To be able to take up hydraulic fluid from the master cylinder 148, the simulator 160 comprises a cylinder 162, in which a piston 164 can be moved counter to a spring force.

In its electrically non-actuated basic position according to FIG. 1, another 2/2-way valve 166 between the master cylinder 148 and the reservoir 122 and actuated by an electromagnet enables hydraulic fluid to get from the reservoir 122 into the master cylinder 148 in PT mode. In its electrically actuated position, on the other hand, the valve 166 uncouples the master cylinder 148 from the reservoir.

The hydraulic connection of the wheel brakes VL and VR is determined by 2/2-way valves 170, 172, 174, 176, which are actuated by electromagnets and in the unactuated, thus electrically non-actuated state assume the basic positions shown in FIG. 1. This means that the valves 170, 174 each assume their throughflow position and the valves 172, 176 each assume their blocking position. Since the two brake circuits I. and II. are formed symmetrically, a description of the components associated with the second brake circuit II. and the wheel brakes HL and HR is omitted here and in the following.

As shown in FIG. 1, the second functional unit 120 is arranged in the fluid path between the valves 174, 176 and the wheel brake VL (and for reasons of symmetry the same applies to the wheel brake VR). The second functional unit 120 assumes a forward position when the first functional unit 110 is fully functioning. To perform normal braking operations, a direct hydraulic connection therefore exists in the basic position of the valves 170, 172, 174, 176 depicted in FIG. 1 between the electrical braking pressure generator 132 (or, depending on the position of the valves 152, 154, the master cylinder 148) on one hand and the wheel brakes HL and VL of the first brake circuit I. on the other hand (and the same applies to the wheel brakes HR and VR of the second brake circuit II.).

The two valves 170 and 172 form a valve arrangement associated with the wheel brake HL, while the two valves 174 and 176 form a valve arrangement associated with the wheel brake VL. As seen from the electrical braking pressure generator 132, the second functional unit 120 is thus provided downstream of the valve arrangement 174, 176 and connected between this valve arrangement 174, 176 and the associated wheel brake VL.

As will be explained below, the two valve arrangements 170, 172 and 174, 176 associated with the wheel brakes HL and VL and the braking pressure generator 132 are each formed to be actuated for wheel braking pressure regulating processes at the respective wheel brake HL and VL. A control device 180 (also described as electronic control unit, ECU) provided for the actuation of the valve arrangements 170, 172 and 174, 176 and of the braking pressure generator 132 in the context of wheel braking pressure regulating processes is likewise depicted schematically in FIG. 1. The control device 180 implements the wheel braking pressure regulating functions of an anti-lock braking system (ABS), for example, vehicle dynamics control (e.g. electronic stability control, ESC), a traction control system (ASR) or adaptive speed control (adaptive cruise control, ACC). Instead of a single control device 180 a plurality of such control devices can naturally also be provided, which are responsible for different wheel braking pressure regulating functions (in a complementary or redundant manner if applicable).

The purpose of an anti-lock braking system (ABS) is to prevent locking of the wheels during braking. To do this it is necessary to modulate the braking pressure in the wheel brakes VL, VR, HL, HR individually. This is done by the adjustment in time sequence of alternating pressure build-up, pressure maintenance and pressure reduction phases, which result due to suitable actuation of the valve arrangements 170, 172 and 174, 176 associated with the wheel brakes HL and VL and if applicable of the braking pressure generator 132.

During a pressure build-up phase the valves 170, 172 and 174, 176 each assume their basic position, so that an increase in the braking pressure in the wheel brakes HL and VL (as in BBW braking) is achieved by means of the braking pressure generator 132. For a pressure maintenance phase only the valve 172 or 174 is actuated, thus transferred to its blocking position. Since an actuation of the valve 172 or 176 does not take place in this case, it remains in its blocking position. The wheel brake HL or VL is hydraulically uncoupled by this, so that a braking pressure present in the wheel brake HL or VL is kept constant. In a pressure reduction phase both the valve 170 or 174 and the valve 172 or 176 are actuated, thus the valve 170 or 174 is transferred to its blocking position and the valve 172 or 176 is transferred to its throughflow position. Hydraulic fluid from the wheel brake HL or VL can thus run off in the direction of the reservoir 122, in order to lower a braking pressure present in the wheel brake HL or VL.

Other braking pressure regulating processes in normal braking operation take place automatically and typically independently of an actuation of the brake pedal 130 by the driver. Such automatic regulation of the wheel braking pressure takes place, for example, in connection with a traction control system (ASR), which prevents spinning of individual wheels in a starting process by targeted braking, vehicle dynamics control (ESC), which adapts the vehicle behaviour in the hazardous range by targeted braking of individual wheels to the driver's request and the road conditions, or adaptive speed control (ACC), which maintains a distance of the vehicle from a vehicle driving in front by autonomous braking among other things.

When performing automatic wheel braking pressure regulation, a braking pressure can be built up at least at one of the wheel brakes HL or VL by actuation of the braking pressure generator 132 by the control device 180. In this case the valves 170, 172 and 174, 176 associated with the wheel brakes HL and VL initially assume their basic positions illustrated in FIG. 1. Fine tuning or modulation of the braking pressure can be undertaken by suitable actuation of the braking pressure generator 132 and of the valves 170, 172 and 174, 176 associated with the wheel brakes HL and VL, as explained above by way of example in connection with ABS regulation.

The wheel braking pressure regulation by means of the control device 180 generally occurs as a function of measured variables (e.g. wheel speeds, yaw rate, lateral acceleration etc.) describing the vehicle behaviour on the one hand and measured variables (e.g. actuation of the pedal 130, steering wheel angle etc.) describing the driver's wish on the other hand. A deceleration desire of the driver can be determined by means of a path sensor 182, for example, which is coupled to the brake pedal 130 or an input element of the master brake cylinder 148. Alternatively or in addition to this, the braking pressure p generated in the master brake cylinder 148 by the driver can be used as a measured variable describing the driver's wish and is then detected by means of at least one sensor. In FIG. 1 a dedicated pressure sensor 184, 184' is associated with each of the brake circuits I. and II. for this.

As explained above, the second functional unit 120 is provided downstream of the valve arrangement 174, 176 as seen from the braking pressure generator 132 and is connected between this valve arrangement 174, 176 and the associated wheel brake VL. Specifically, a hydraulic fluid input of the second functional unit 120 is coupled between an output of the valve 174 and an input of the valve 176 (seen in the flow direction from the pressure generator 132 towards the reservoir 122).

The second functional unit 120 comprises the unpressurised reservoir 124 already mentioned, which is provided in addition to the first unpressurised reservoir of the first functional unit 110. The second functional unit 120 further comprises another electrical braking pressure generator 188. The other braking pressure generator 188 can be actuated by the control device 180 or a separate control device (cf. FIG. 6).

In the exemplary embodiment, the braking pressure generator 188 comprises an electric motor 190 and a pump 192, 192' executed as a gear type pump or radial piston pump, for example, per brake circuit I. and II. (here: per wheel brake VL and VR). Each pump 192, 192' is blocking counter to its conveying direction, as depicted by means of the stop valves at the output and input of the pumps 192, 192'. The pumps 192, 192' are each configured to draw hydraulic fluid from the reservoir 124. Since the speed of the electric motor 192 is adjustable, the delivery volume of the pumps 192, 192' can also be adjusted by means of corresponding actuation of the electric motor 192. In another embodiment the two pumps 192, 192' could also be replaced by a single pump operating according to the plunger principle (for example, with a single- or double-acting cylinder-piston arrangement).

The second functional unit 120 is also formed symmetrically in regard to the brake circuits I. and II. In the following, therefore, only the components of the second functional unit 120 associated with the first brake circuit I. (here: the wheel brake VL) are again explained in greater detail. These components comprise (apart from the pump 192) a cylinder-piston arrangement 194, a pressure sensor 196 provided on the output side of this arrangement 194 and a valve 198.

The cylinder-piston arrangement 194 permits a hydraulic separation between the hydraulic system of the first functional unit 110 and the hydraulic system of the second functional unit 120. This separation is advantageous in particular in the event of a defective functionality of the first functional unit 110 on account of a leak.

The valve 198 is provided between an output of the pressure generator 188 (i.e. the pump 192) on one hand and the reservoir 124 on the other hand. The valve 198 is specifically a 2/2-way valve actuated by an electromagnet. In the electrically non-actuated basic position of the valve 198 according to FIG. 1, the pump 192 conveys hydraulic fluid from the reservoir 122 back to the reservoir 122 during operation.

In the electrically actuated position of the valve 198, the reservoir 124 is uncoupled from the pump outlet, so that the pump 192 conveys hydraulic fluid during operation from the reservoir 124 into a chamber 194' on the input side of the cylinder-piston arrangement 194 (the fluid path from the pump 192 to the valve 198 passes through the chamber 194' on the input side). A separating piston 194''' provided between the chamber 194' on the input side and a chamber 194" on the output side of the cylinder-piston arrangement is displaced in this way and hydraulic fluid is conveyed from the chamber 194" on the output side to the wheel brake VL. A wheel braking pressure at the wheel brake VL is generated or increased by this. The path from the cylinder-piston arrangement 194 designated L represents a leakage path and permits a reliable separation of the two hydraulic systems in the event of a leak at the pressure seals of the cylinder-piston arrangement 194.

In the basic position of the cylinder-piston arrangement 194 depicted in FIG. 1, the fluid path from the valve arrangement 174, 176 to the wheel brake VL passes through the output-side chamber 194" of this arrangement 194. The cylinder-piston arrangement 194 has a negligible throttle effect in this basic position for the hydraulic fluid conveyed from the pressure generator 132 to the wheel brake VL or drained from the wheel brake VL into the reservoir 122.

However, as soon as the piston 194' of the cylinder-piston arrangement 194 is moved out of its basic position (thus when the pump 192 pumps hydraulic fluid out of the reservoir 124 into the input-side chamber 194' of the cylinder-piston arrangement 194), the wheel brake VL is uncoupled hydraulically by means of the piston 194' from the first functional unit 110 and thus from the pressure generator 132 and the reservoir 124. The wheel braking pressure regulation at the wheel brake VL takes place in this case exclusively via the second functional unit 120. In specific terms, the pressure currently prevailing at the wheel brake VL is registered for pressure regulation purposes by means of the pressure sensor 196. Regulation is carried out in this case to a target pressure value by suitable actuation of the pressure generator 188 and thus of the pump 192 (pressure build-up) or the control valve 198 (pressure reduction). The corresponding pressure evaluation and actuation of the pressure generator 188 and of the control valve 198 is carried out, as set out above, by the control device 180 or a separate control device for the second functional unit 120 (cf. FIG. 6).

Accordingly, as soon as a lack of functionality of the first functional unit 110 is detected (e.g. on account of failure of the pressure generator 132 or a leak in the area of the first functional unit 110), the second functional unit 120 can immediately bring the vehicle to a stop in a redundant manner relative to the first functional unit 110 and in doing so take over any ABS regulation that may be required at the wheel brakes VL and VR. In addition or alternatively to this, if the first functional unit 110 fails, one or more of the following (or other) braking pressure regulation functionalities can be carried out autonomously by means of the second functional unit 120: ESC, ASR and ACC.

The redundancy created by the second functional unit 120 therefore facilitates the use of the motor vehicle brake system 100 depicted in FIG. 1 also for the applications of autonomous or semi-autonomous driving. In this application in particular, the master cylinder 148 and its accompanying components (such as the brake pedal 130 and the simulator 160) could also be omitted completely.

Due to the implementation depicted in FIG. 1 of the second functional unit 120 with separating piston 194''' and separate reservoir 124, additional throttle points (such as present e.g. in the area of the first functional unit 110 in the form of valves 152, 170, 172 etc.) are eliminated. Such throttle points negatively influence the so-called "time to lock" of the corresponding wheel brake in ABS regulation, for example, when a rapid build-up of pressure is required. Furthermore, adequate ABS functionality can be achieved by means of a single control valve 198 per wheel brake. The second functional unit 120 could, as set out above, be delivered as a stand-alone module (with prefilled reservoir 124 if applicable) to the assembly line and fitted, so that following connection of the brake lines only the customary venting procedure has to be carried out.

On account of the two separate hydraulic systems in the exemplary embodiment according to FIG. 1, the hydraulic system in particular of the second functional unit 120, which is only used after all in emergencies, must be checked on an ongoing basis (e.g. periodically).

To do this, the pump 192 is actuated automatically at set intervals by the control device 180 when the vehicle is safely stopped (e.g. when the parking brake is closed or the gear lock has been activated). The pump 192 thereupon pumps hydraulic fluid from the reservoir 124, the filling level of which falls accordingly, when the valve 198 is closed. The separating piston 194''' is moved, due to which—as described above—the first functional unit is uncoupled hydraulically from the wheel brake VL and also the second functional unit 120. A pressure build-up takes place at the same time at the wheel brake VL. This pressure can be measured for testing purposes by means of the pressure sensor 196. The reduction in the filling level of the hydraulic fluid in the reservoir 124 that accompanies the increase in wheel pressure can likewise be measured by means of an optional filling level sensor. The appropriately measured parameters can be compared with target values to verify the functionality of the second functional unit 120.

The filling level sensor is ideally arranged so that it can already recognise a slight decrease in the filling level in the reservoir 124 (e.g. of less than approx. 30% and in particular of less than approx. 15%). In this way it is not necessary to build up an especially high pressure at the wheel brake 192 by means of the pump 192, which reduces wear, test duration, energy consumption etc.

FIGS. 2 to 12 show other exemplary embodiments of motor vehicle brake systems 200 to 1200. These other exemplary embodiments are based on the first exemplary embodiment described with reference to FIG. 1, in particular with respect to the first functional unit 110. For this reason the differences from the first exemplary embodiment are chiefly described below. These differences substantially concern the construction of the second functional unit 120 and the connection of this second functional unit 120 to the first functional unit 110 and to the wheel brakes. The same reference signs describe the same or similar components here. Furthermore, with respect to the second functional unit 120 again only the components for the first brake circuit I. (here: the wheel brake VL) are explained for the most part, as the second functional unit 120 is constructed symmetrically in most exemplary embodiment in relation to the two brake circuits I. and II.

Figure 2:
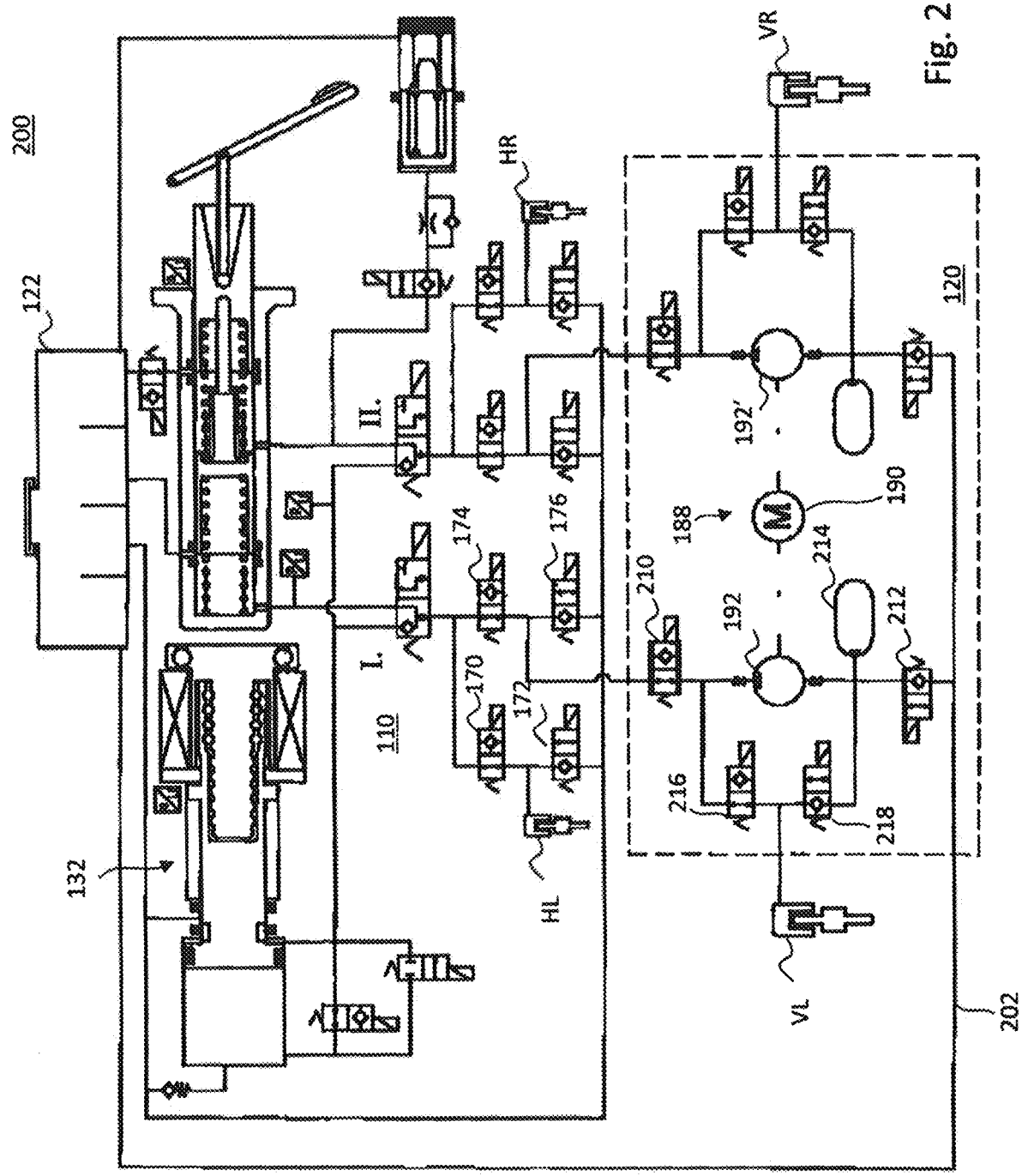

Referring to the second exemplary embodiment of the motor vehicle brake system 200 according to FIG. 2, a difference from the first exemplary embodiment according to FIG. 1 consists in that the second functional unit 120 dispenses with the separate reservoir 124 and the cylinder-piston arrangement 194 (with the separating piston 194'''). Two separate hydraulic systems are thus also dispensed with. Separate servicing of the hydraulic system associated with the second functional unit 120 is eliminated in this way. In particular, ageing of the hydraulic fluid in this hydraulic system does not pose a problem, therefore, and its regular exchange is eliminated. On the other hand, the redundancy of the overall system is reduced, for example in the event of a leak of one of the two hydraulic systems according to FIG. 1. This reduced redundancy is mitigated, however, in the exemplary embodiment according to FIG. 2 by the retention of the two brake circuits I. and II., which are separated from one another for the most part.

According to the second exemplary embodiment, the two functional units 110, 120 now "share" a hydraulic system (namely that of the first functional unit 110 with the reservoir 122, cf. the first exemplary embodiment). The second functional unit 120 is thus also operated entirely with hydraulic fluid from the reservoir 122 and conveys the hydraulic fluid back to this reservoir 122 (cf. return line 202 in FIG. 2).

The omission of the cylinder-piston arrangement 194 (with the separating piston 194''') from FIG. 1 is compensated for in the second exemplary embodiment by the provision of an isolation valve 210. The isolation valve 210 forms a component of the second functional unit 120 on the input side and facilitates a hydraulic uncoupling of the second functional unit 120 from the first functional unit 110 in the event of a malfunction of the first functional unit 110 (e.g. if the pressure generator 132 fails).

The isolation valve 210, which is formed in the second exemplary embodiment as a 2/2-way valve actuated by an electromagnet, makes it possible in its electrically non-actuated basic position according to FIG. 2 for hydraulic fluid from the first functional unit 110 to be able to get to the wheel brake VL. In its electrically actuated position, on the other hand, the isolation valve 210 uncouples the first functional unit 110 from the wheel brake VL at least in one direction. The isolation valve 210 specifically has a one-sided blocking effect in its electrically actuated position. Hydraulic fluid can thus continue to be conveyed out of the first functional unit 110 via the second functional unit 120 to the wheel brake VL, but no hydraulic fluid can escape from the second functional unit 120 into the first functional unit 110 (e.g. on actuation of the pressure generator 188).

The second functional unit 120 has a 2/2-way valve 212 actuated by an electromagnet on the output side to the reservoir 122. In its electrically non-actuated basic position according to FIG. 2, this valve 212 prevents hydraulic fluid from being drawn from the reservoir 122 by the pressure generator 188. On the contrary, during operation of the pressure generator, hydraulic fluid is taken from a pressure accumulator 214 when the valve 212 is in its basic position. The pressure accumulator 214 has sufficient volume to be able to bring the vehicle to a stop in emergency braking.

Specifically the valve 212 has a one-sided blocking effect in its basic position. According to this one-sided blocking effect, hydraulic fluid can escape from the second functional unit 120 into the reservoir, but—as explained—cannot be drawn from the reservoir 122 when the pressure generator 188 is actuated. Furthermore, the valve 212 assumes a forward position in its electrically actuated state, so that hydraulic fluid can be drawn by the pump 192 from the reservoir 122 or drained from the wheel brake VL into the reservoir 122.

Provided between the two valves 210 and 212 and parallel to the pump 192 are two other valves 216 and 218. The hydraulic connection from the pressure generator 188 to the wheel brake VL is determined by these electromagnetically actuated 2/2-way valves 216 and 218. In the unactuated, thus electrically non-actuated state the valves 216, 218 assume the basic positions depicted in FIG. 2. This means that the valve 216 assumes its throughflow position and the valve 218 assumes its blocking position. In respect of the functionality of the valves 216 and 218 and of the pressure generator 188 in autonomous pressure regulation processes of the second functional unit 120, let reference be made to the above statements in respect of the two valves 174 and 176 and of the pressure generator 132. These components (and their functions such as e.g. ABS or ESC regulation) are therefore present in a redundant manner both in the first functional unit 110 and in the second functional unit 120.

The second functional unit 120 can optionally also comprise a pressure sensor, which is not depicted in FIG. 2 (cf. reference sign 196 in FIG. 1). This pressure sensor can be used in autonomous pressure regulation processes of the second functional unit 120 as outlined above.

Figure 3:
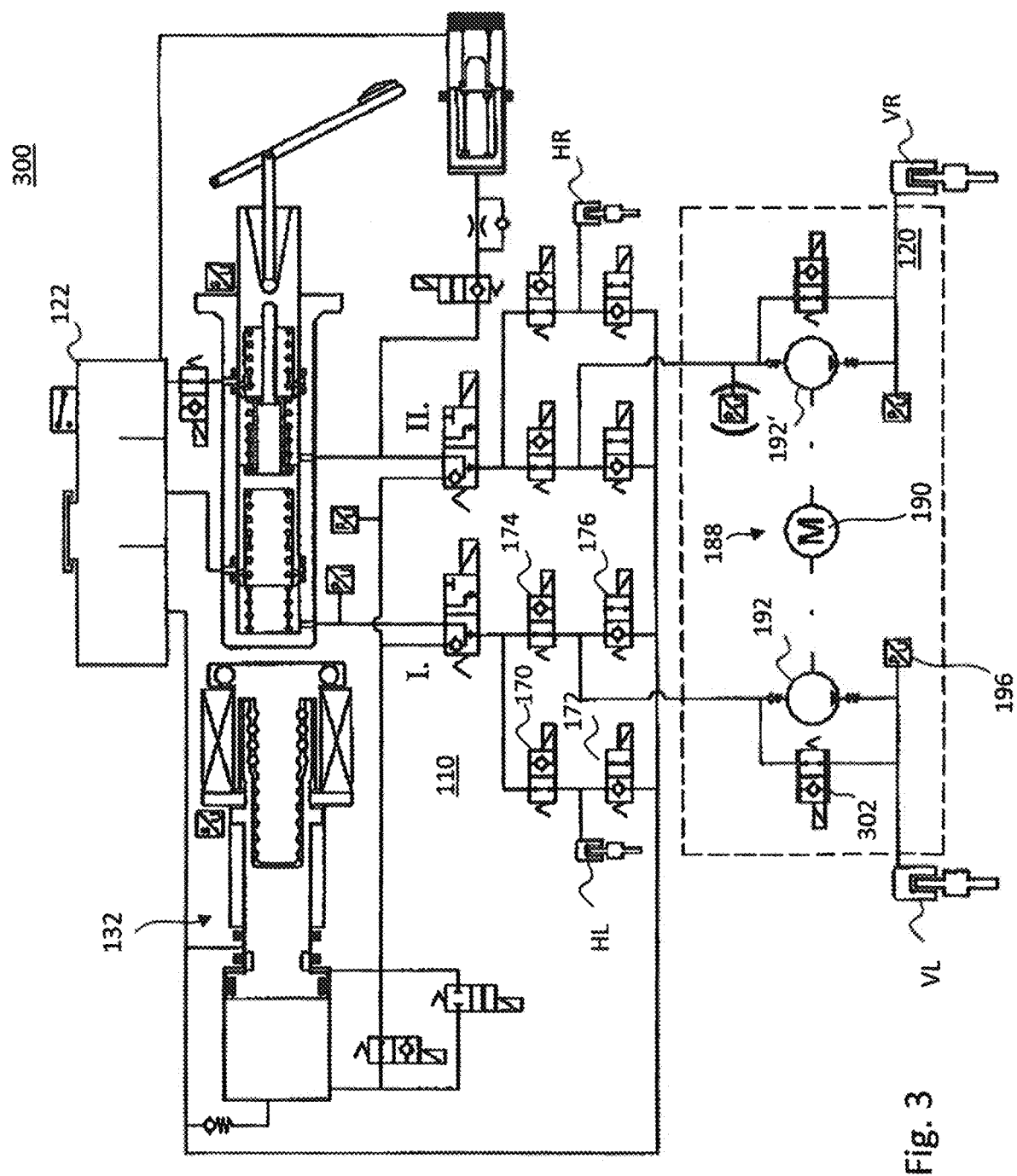

Referring now to the third exemplary embodiment of a motor vehicle brake system 300 according to FIG. 3, a difference from the first exemplary embodiment consists in that the separate reservoir 124 and the cylinder-piston arrangement 194 (with the separating piston 194''') are again omitted in the second functional unit 120. Two separate hydraulic systems are thus also dispensed with. Furthermore, a difference from the second exemplary embodiment consists in the omission of the direct suction line 202 for the pump 192 to the reservoir 122 and of the pressure accumulator 214. If the second functional unit 120 is used, the pump 192 therefore aspirates directly via the corresponding input-side connection to the first functional unit 110 via this (and the correspondingly open valve 176) from the reservoir 122.

In the case of operation of the second functional unit 120, pressure regulation takes place by ongoing read-out of the prevailing pressure via the pressure sensor 196 and corresponding actuation of the pump 192. An optional pressure sensor (not shown) provided on the input side of the second functional unit could be provided for recognition of braking by the driver (e.g. via the master cylinder 148) into the active second functional unit 120. ACC regulation just carried out by the second functional unit 120 could be aborted in this way in favour of emergency braking of the vehicle to a stop.

A bypass valve 302 formed in the exemplary embodiment as a 2/2-way valve actuated by an electromagnet is connected parallel to the pump 192. This valve 302 assumes the basic position depicted in FIG. 3 in the unactuated, thus electrically non-actuated state. Basic position here means that the valve 302 assumes its throughflow position. Hydraulic fluid can be conveyed in this way from the first functional unit 110 to the wheel brake VL and flow back again to the first functional unit 110 (and to the reservoir 122).

In the electrically actuated state the valve 302 assumes a blocking position so that hydraulic fluid conveyed by the pump 192 reaches the wheel brake VL and cannot escape towards the first functional unit 110. Such an escape (in the forward position of the valve 302) may then be desirable in the context of pressure regulation on the part of the second functional unit 120, however, if braking pressure at the wheel brake VL has to be reduced (e.g. as part of ABS regulation). Since in its blocking position in the exemplary embodiment the valve 302 only blocks one-sidedly, the braking pressure at the wheel brake VL can still be increased by means of the first functional unit 110 (e.g. on actuation of the master cylinder 148 in PT mode).

Figure 4:
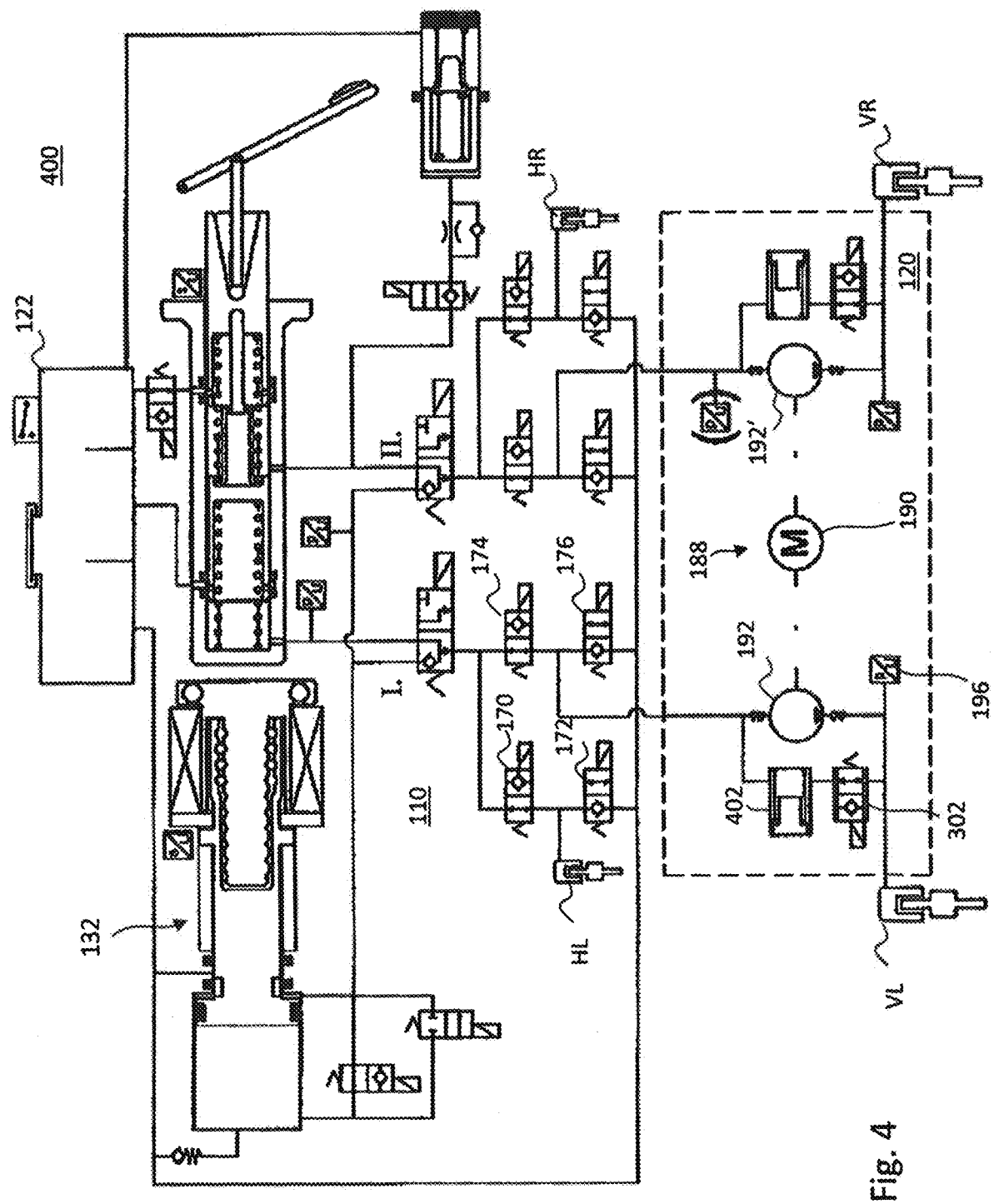

Referring to the fourth exemplary embodiment of a motor vehicle brake system 400 according to FIG. 4, a difference from the third exemplary embodiment consists in the provision of a component 402, which provides additional hydraulic fluid volume for aspiration by the pump 192. The background to this storage of additional hydraulic volume is the fact that the suction path of the pump 192 through the first functional unit 110 could not make hydraulic fluid volume available sufficiently fast at low temperatures above all. Depending on the design of the functional units 110, 120, the provision of additional hydraulic fluid volume may also be generally desirable (independently of temperature if necessary) to support a rapid pressure build-up at the wheel brake VL.

In the present exemplary embodiment, the component 402 is formed as a pressure accumulator, specifically as a spring-loaded piston accumulator. The pressure accumulator 402 could also be a diaphragm accumulator or a piston sealed by a rolling bellows.

The pressure accumulator 402 is arranged in a flow-through manner between the input of the pump 192 and the hydraulic interface with the first functional unit 110 on one hand and the valve 302 on the other hand. The flow-through arrangement permits simple ventilation and a simple exchange of the hydraulic fluid in the context of regular servicing.

Figure 5:
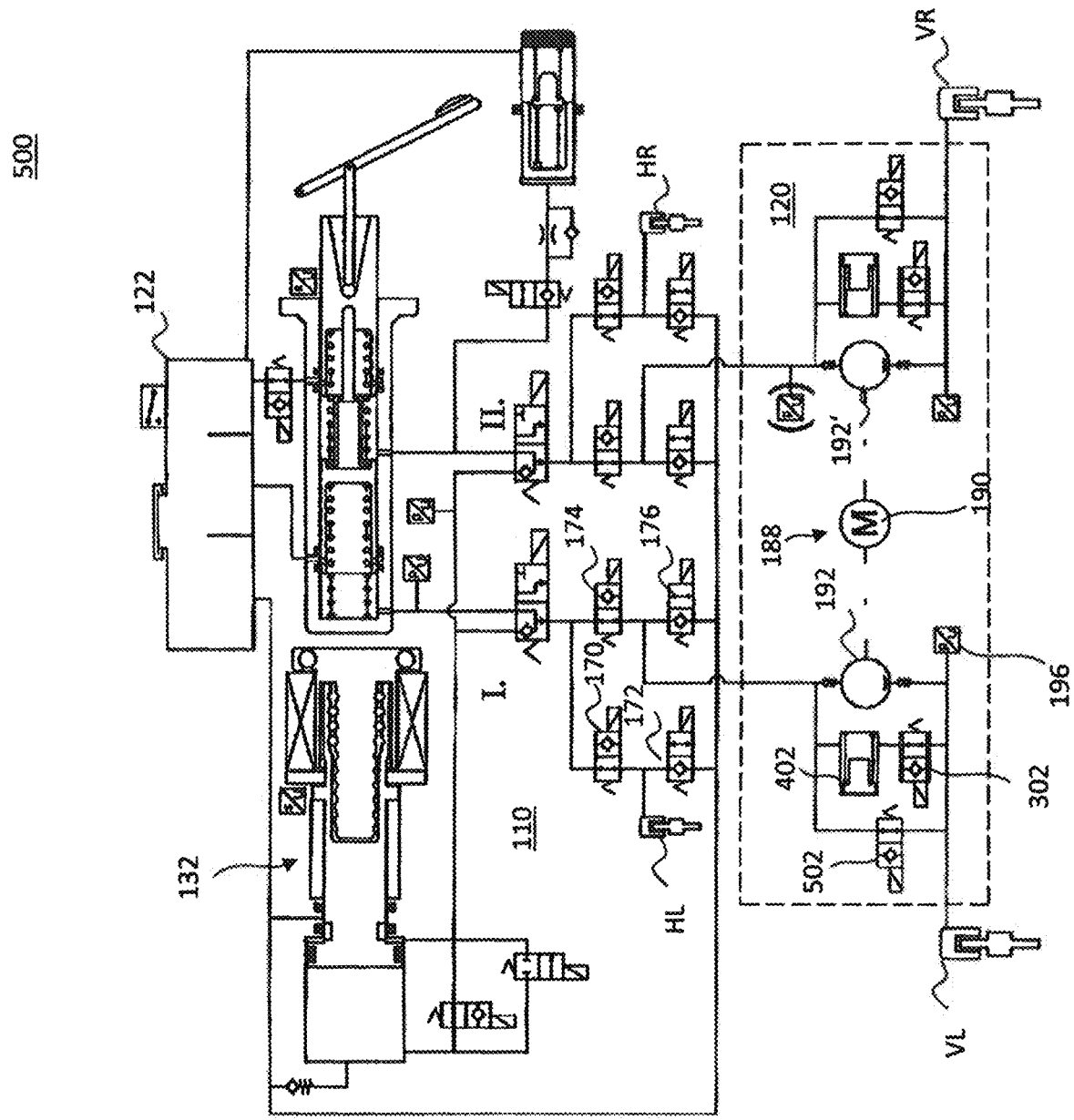

Referring now to the fifth exemplary embodiment of a motor vehicle brake system 500 according to FIG. 5, a difference from the fourth exemplary embodiment consists in the provision of another bypass valve 502, which is arranged parallel to the bypass valve 302 and is switched together with this. In the unactuated, thus electrically non-actuated state, the valve 502, which is formed in the exemplary embodiment as an electromagnetically actuated 2/2-way valve, assumes the basic position depicted in FIG. 5. Basic position means, as in the case of the valve 302, that the valve 502 assumes its throughflow position.

Thus, even in the case of an erroneously closed bypass valve 302 or blocking malfunction of the flow-through pressure accumulator 402, hydraulic pressure at the wheel brake VL can still be reduced via the open valve 502. The flow resistance from the first functional unit 110 to the wheel brake VL is also reduced by the two valves 302 and 502 connected in parallel, so that in the case of a required rapid pressure build-up at the wheel brake VL, the so-called "time to lock" of this wheel brake VL is also reduced. It is understood that this is the case in the same way with the wheel brake VR. In general, all the statements made in connection with the exemplary embodiments with regard to the wheel brake VL also apply to the wheel brake VR due to the symmetrical design of the brake systems 100 to 500.

Figure 6:
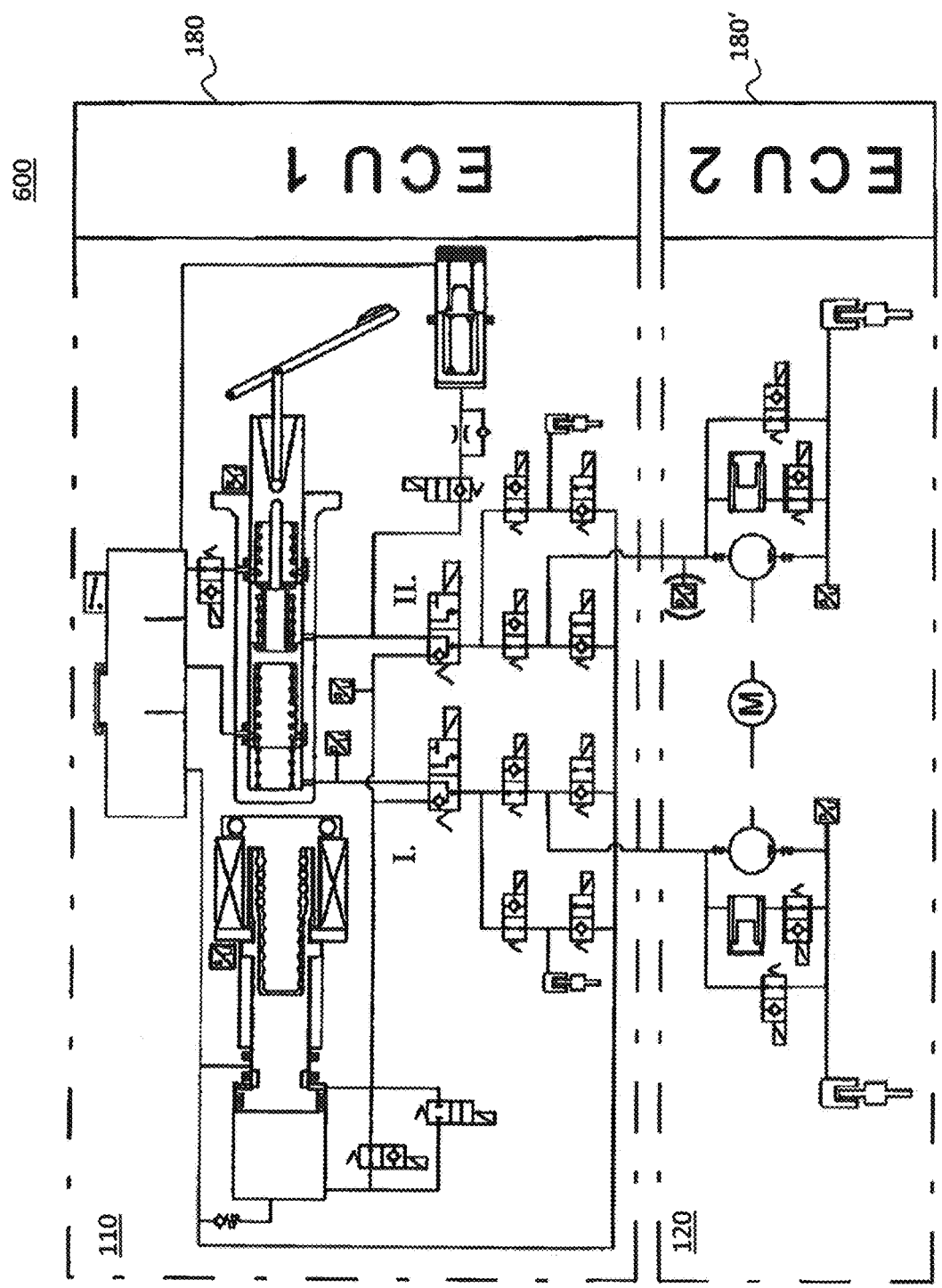

Referring to the sixth exemplary embodiment of a motor vehicle brake system 600 according to FIG. 6, it is depicted by way of example for the fifth exemplary embodiment that separate control devices 180 and 180' can be provided for the two functional units 110 and 120 (this optional redundancy could naturally also be implemented in all other exemplary embodiments).

Each of these two control devices 180 and 180' is able to carry out braking pressure regulation at the pertinent wheel brake(s) autonomously. Here the control device 180' associated with the second functional unit 120 implements all or a subset of the braking pressure regulating functions of the control device 180 associated with the first functional unit 110 (e.g. ASR, ESC, ABS, ACC etc.).

In addition or alternatively to providing separate control devices 180, 180', two redundant energy supplies and/or separate energy supplies could also be provided for the two functional units 110, 120. These energy supplies could be formed as two accumulators.

Figure 7:
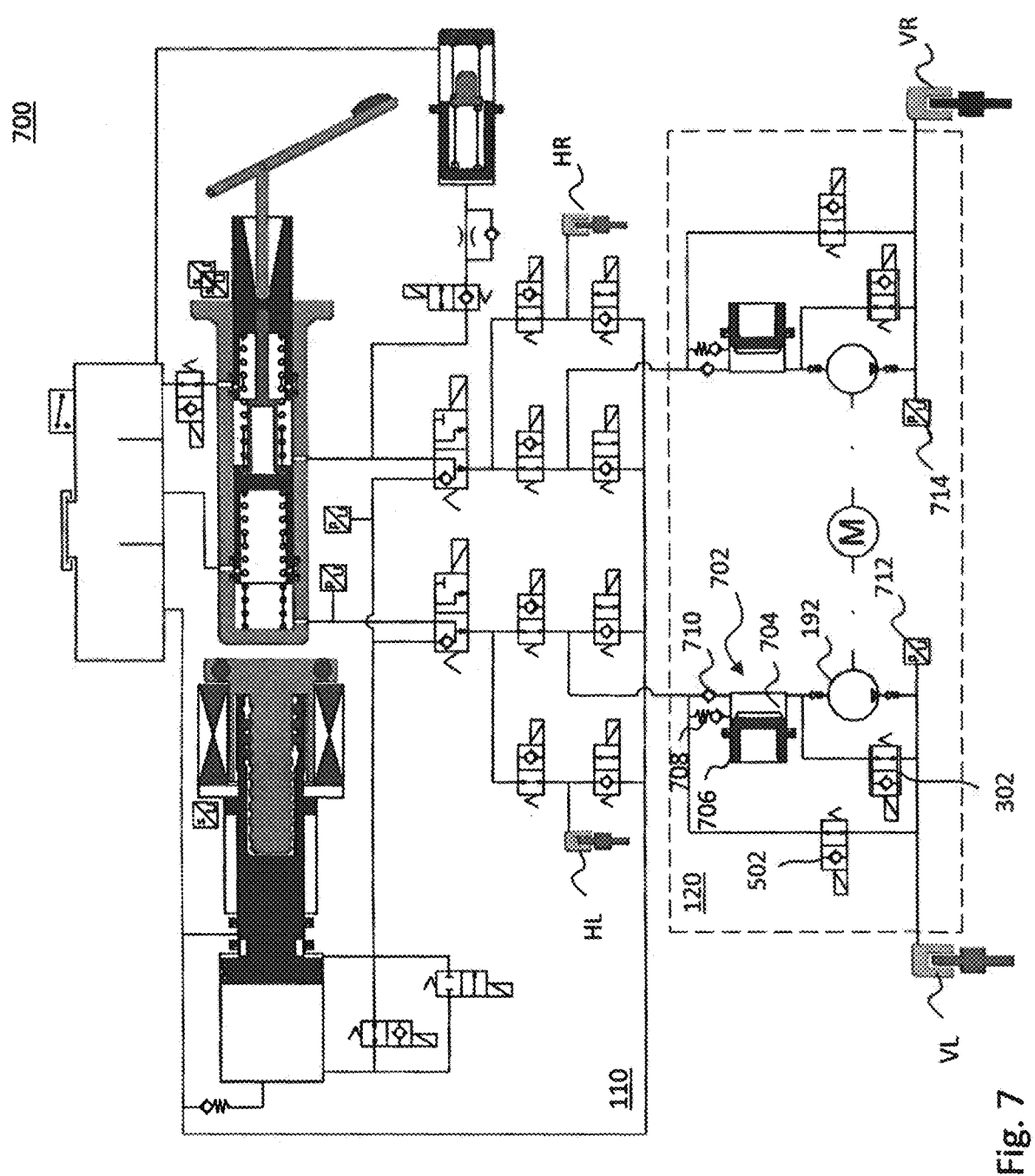

Referring now to the seventh exemplary embodiment of a motor vehicle brake system 700 according to FIG. 7, a difference from the fifth exemplary embodiment consists in that, instead of the pressure accumulator 402, a fluid reservoir formed as a piston accumulator 702 is provided, which manages without a return spring. The piston accumulator 702 is provided in a fluid path between the pump 192 and the valve 302 on one hand and the first functional unit 110 and the second valve 502 on the other hand. It should be pointed out that the piston accumulator 702 could be provided in the exemplary embodiment according to FIG. 4 also instead of the pressure accumulator 402 and upstream of the pump 192 and the valve 302.

As illustrated in FIG. 7, the piston accumulator 702 comprises a cylinder 704 and a piston 706, which is taken up movably therein. The piston accumulator 702 is provided with a lip seal, which can take over sealing of the piston 706 against atmospheric pressure. As already mentioned at the beginning, however, a return spring or a similar element to push the piston 706 back into its storage position following partial or complete emptying of the piston accumulator 702 is lacking.

The storage position of the piston 706 corresponds to the position in which the piston 704 is substantially maximally filled with hydraulic fluid. On aspiration of hydraulic fluid by the pump 192 from the cylinder 704, the piston 706 moves from its storage position to a draw-off position. In order then to push the piston 706 from this draw-off position back into its storage position, it is provided according to the exemplary embodiment in FIG. 7 that hydraulic fluid flowing back from the pressurised wheel brake VL, VR in the direction of the first functional unit 110 is able to push the piston 706 into its storage position.

To do this, the valve 502 is closed and the valve 302 opened, so that the hydraulic fluid flowing back can get into the cylinder 704. In this case the cylinder 706 is moved counter to atmospheric pressure until a line communicating with the cylinder 706 is released to the first functional unit 110. Provided in this line is a spring-loaded non-return valve 708, which permits hydraulic fluid to flow back to the first functional unit 110, but acts in a blocking manner in the opposite direction. The opening pressure for opening the non-return valve 708 is set here to be comparatively low and is less than 1 bar (e.g. 0.5 bar).

Parallel to the line between the cylinder 704 and the first functional unit 110 in which the non-return valve 708 is accommodated, another non-return valve 710 is provided in another line between the first functional unit 110 and the cylinder 704, which is arranged opposing the non-return valve 708. This second non-return valve 710 permits aspiration of hydraulic fluid by the pump 192 from the first functional unit 110 through the cylinder 704 (and acts in a blocking manner in the opposite direction). With regard to the line with the non-return valve 708, the line with the non-return valve 710 is mounted axially offset on the cylinder 704 so that aspiration of hydraulic fluid from the first functional unit 110 through the cylinder 704 is possible in any position of the piston 706.

The non-return valve 710 is formed either without a closing spring, as shown in FIG. 7, or with a closing spring. A possible closing spring brings about an extremely low opening pressure of less than 0.5 bar, in particular less than 0.2 or 0.1 bar.

According to the exemplary embodiment depicted in FIG. 7, it is ensured that the piston 706, on completion of an emergency braking function, for example, always returns to its original position, thus the storage position. Pressure regulation at the individual wheels can also take place in the exemplary embodiment according to FIG. 7 by so-called flow-off regulation. If corresponding wheel pressure sensors 712, 714 are present in the second functional unit 120, as shown in FIG. 7, a closed control loop can be realised. If the wheel pressure sensors 712, 714 are omitted, on the other hand, "open-loop" control would also be conceivable.

In a further development of the exemplary embodiment according to FIG. 7 (and the other exemplary embodiments described here), the second functional unit 120 can also take over "blending" during regenerative braking in normal braking operation (thus with full functionality of the first functional unit 110). This blending can be carried out for individual wheels. The endurance demands made on the first functional unit 110 can be significantly reduced in this way.

Figure 8:
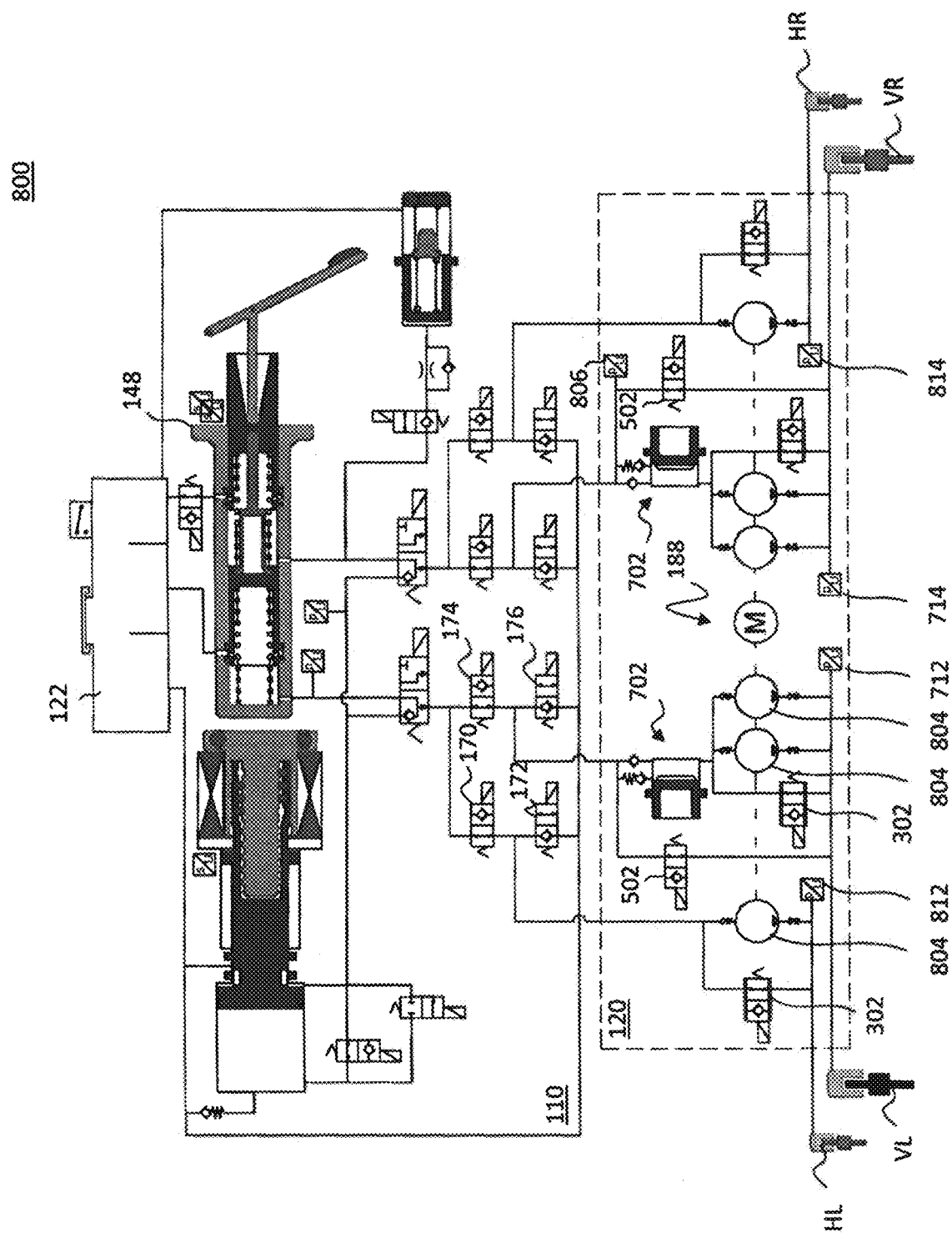

Referring to the eighth exemplary embodiment according to FIG. 8, a difference from the previous exemplary embodiments consists in all four wheel brakes VL, VR, HL and HR being connected to the second functional unit 120 and the second functional unit 120 now being able to carry out braking pressure build-up (and in particular braking pressure regulation) at all these wheel brakes. As shown by way of example for the left rear wheel brake HL, a hydraulic fluid input of the second functional unit 120 for the left rear wheel HL is coupled between an output of the valve 170 and an input of the valve 172 (as seen in the flow direction from the pressure generator 132 towards the reservoir 122). It should be pointed out that the exemplary embodiments described with reference to FIGS. 1 to 7 could also be developed in this way.

Specifically a separate fluid path extending between the first functional unit 110 and the second functional unit 120 with a corresponding bypass valve 302 for the respective pump is now provided per wheel brake. This valve 302 assumes its throughflow position in the electrically non-actuated state, so that hydraulic fluid can be conveyed from the first functional unit 110 to the corresponding wheel brake and can flow back again to the first functional unit 110 (and to the reservoir 122).

In the exemplary embodiment according to FIG. 8, the second hydraulic pressure generator 188 comprises a multi-piston pump. The multi-piston pump is specifically formed as a six-piston pump, wherein two pistons 804 are provided respectively for the two front wheel brakes VL, VR and one piston 804 is provided for each of the two rear wheel brakes HL, HR. A particularly high pressure build-up gradient can be achieved in this way at the front wheel brakes VL, VR. A further (optional) bypass valve 502 and the (optional) piston accumulator 702 explained above are also respectively associated with the two front wheel brakes VL, VR for this purpose.

In connection with the exemplary embodiment according to FIG. 8 it should be pointed out that this exemplary embodiment can be modified in various respects. The six-piston pump could be replaced by a four-piston pump, for example, wherein precisely one pump piston 804 is then associated with each wheel brake. Furthermore, the bypass valve 502 provided per front wheel brake VL, VR could also be omitted. The piston accumulator 702 (as already explained in connection with FIG. 7) could also be replaced by the pressure accumulator 402 according to FIG. 4 or another fluid reservoir. Finally, instead of a multi-piston pump a corresponding plurality of gear type pumps or a central plunger arrangement could also be provided.

As shown in FIG. 8, the second functional unit 120 again comprises a separate pressure sensor 712, 714, 812, 814 per wheel brake. This pressure sensor can be omitted if "open-loop" control can be considered.

Furthermore, another pressure sensor 806 is provided on the input side in the second functional unit 120. The pressure sensor 806 is specifically located in the exemplary embodiment according to FIG. 8 in the fluid line to the right front wheel brake VR upstream of the bypass valve 502 and of the piston accumulator 702 and the non-return valves associated with this piston accumulator 702. The pressure sensor 806 is provided to enable driver braking desire recognition even when, in a failure of the first functional unit 110, no driver desire recognition should be possible any longer there. The hydraulic pressure built up by the driver by means of the master cylinder 148 can thus be recognised by means of the pressure sensor 806. The hydraulic pressure recognised in such a way can be used to actuate the second braking pressure generator 188. The other pressure sensor 806 could be provided in the respective second functional unit 120 in the other exemplary embodiments presented here also.

Figure 9:
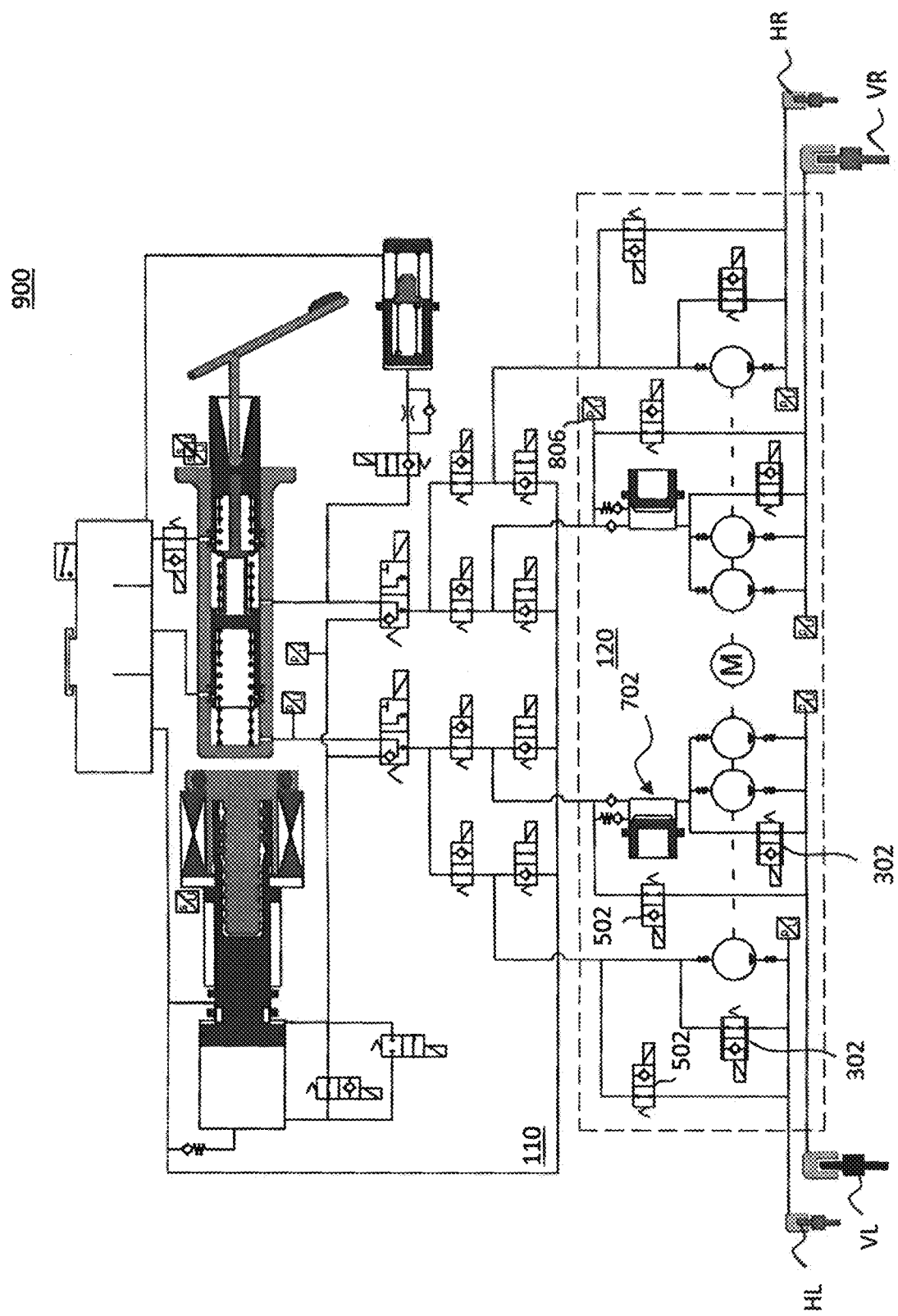

In the ninth exemplary embodiment of a motor vehicle brake system 900 according to FIG. 9, a difference from the eighth exemplary embodiment according to FIG. 8 now consists in the provision of a bypass valve 502 for each of the two rear wheel brakes HL, HR also. Reference may be made here to the description of this bypass valve 502 in connection with the fifth exemplary embodiment.

Referring now to the tenth exemplary embodiment of a motor vehicle brake system 1000 according to FIG. 10, a difference from the ninth exemplary embodiment now consists in the provision for each of the two rear wheel brakes HL, HR also of a volume accumulator and specifically a piston accumulator 702 with the functionality described with reference to the seventh exemplary embodiment according to FIG. 7. A rapid pressure build-up with a high pressure build-up gradient can be guaranteed in this way at the rear wheel brakes HL, HR also in the event of emergency braking.

Figure 10:
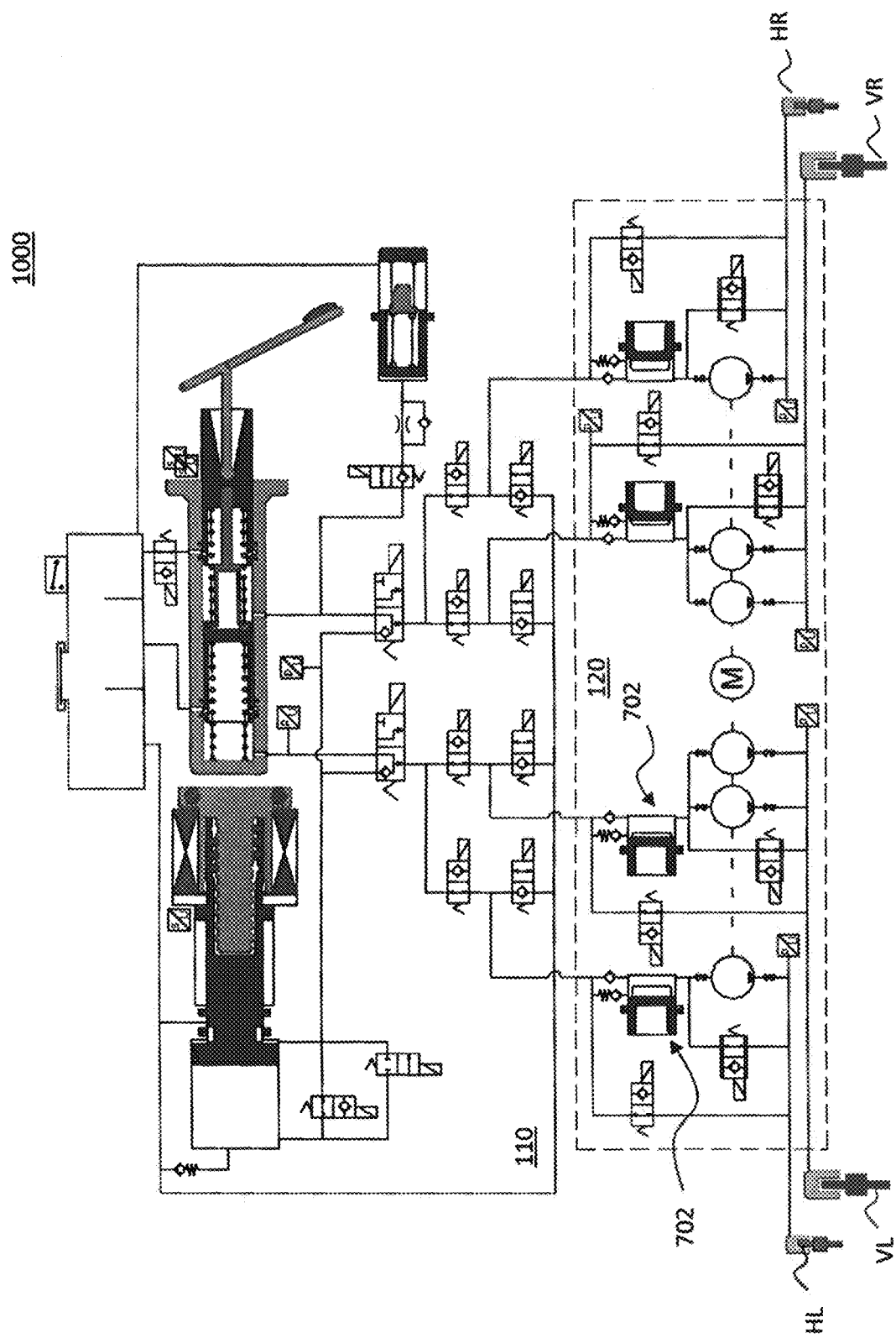
Figure 11:
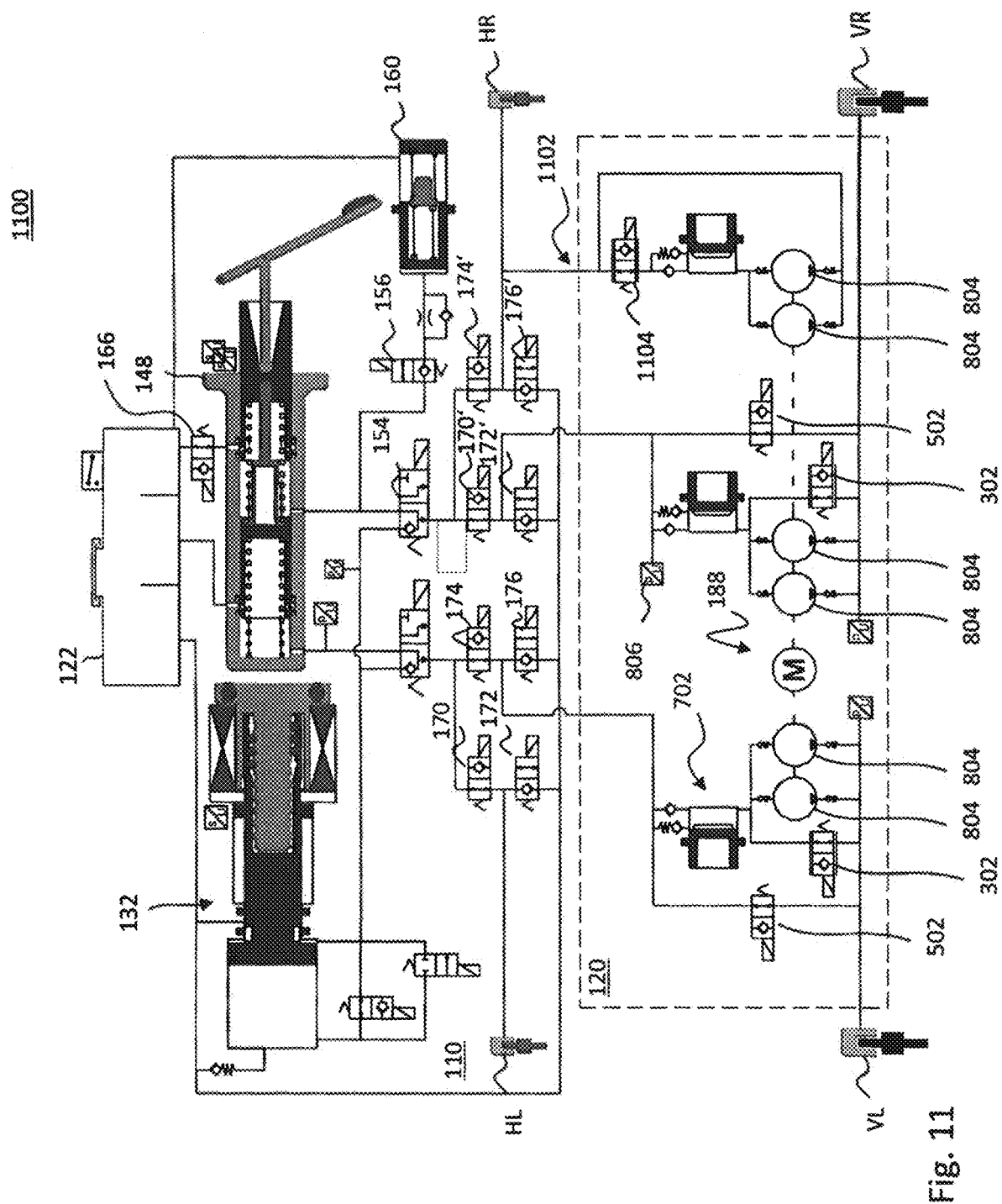

Referring to the eleventh exemplary embodiment of a motor vehicle brake system 1100 according to FIG. 11, a common feature with the exemplary embodiments according to FIGS. 8 to 10 consists in the second functional unit 120 being able to execute a braking pressure build-up at all four wheel brakes of the motor vehicle. In contrast to the exemplary embodiments according to FIGS. 8 to 10, the rear wheel brakes HL, HR are now no longer connected to the second functional unit 120, however, but to the first functional unit 110 (corresponding to the exemplary embodiments according to FIGS. 1 to 7). It is just the same with the motor vehicle brake system 1200 according to the twelfth exemplary embodiment depicted according to FIG. 12.

Figure 12:
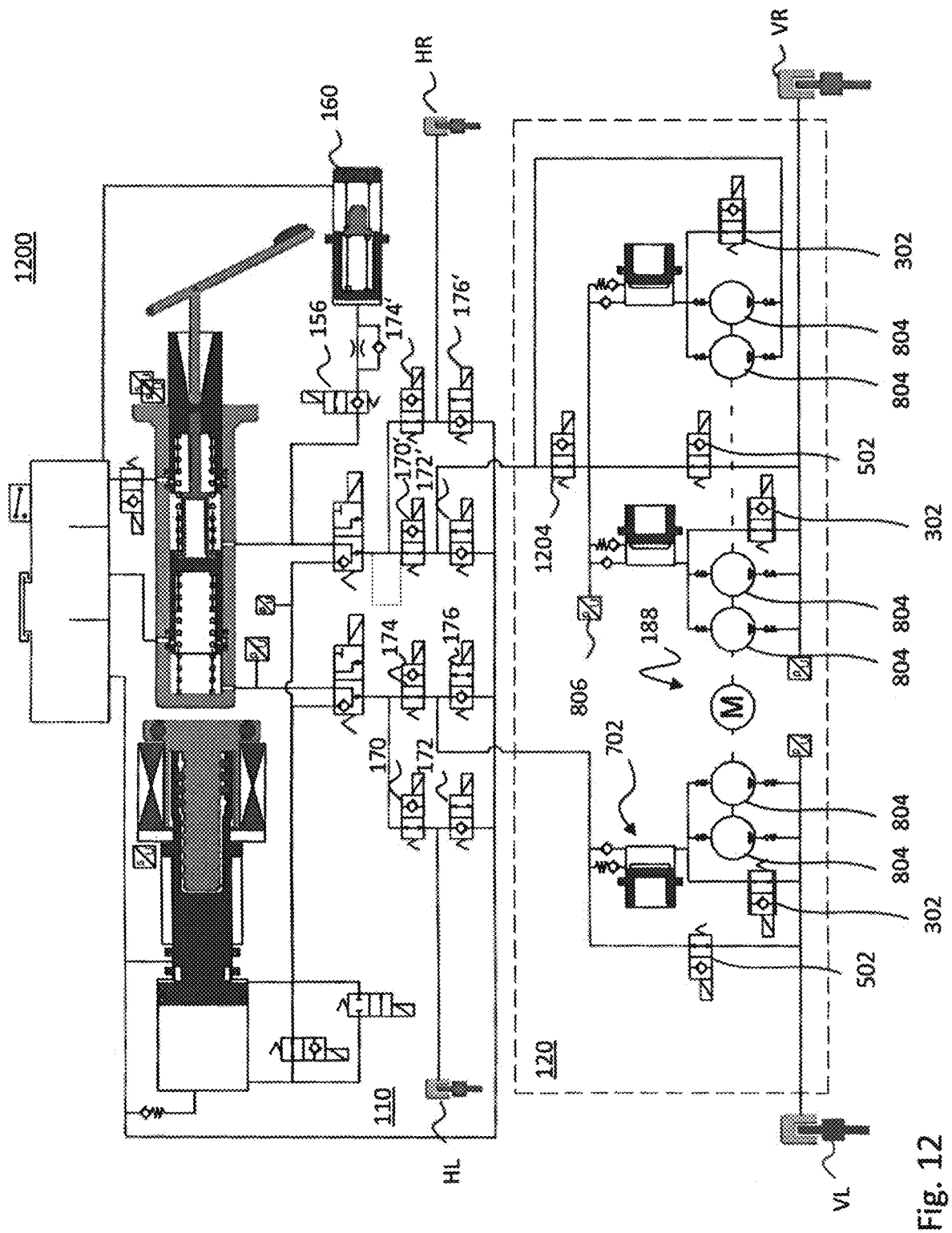

In the exemplary embodiments according to FIGS. 11 and 12, it was taken into account that the first functional unit 110 can be affected by different failure scenarios. A complete failure of the first functional unit 110, including all valve drivers for the valves installed in the first functional unit 110, is relatively improbable. A failure of the motor control for the first braking pressure generator 132 is still improbable, but rather more probable.

The brake systems 1100 and 1200 are configured for this reason so that a graduated degradation of braking functionalities is possible. For the extremely unlikely case of a complete failure of the first functional unit 110, braking intervention by means of the second functional unit 120 at the front wheel brakes VL, VR is still possible. For a more likely failure of just the motor control or of another component of the first braking pressure generator 132 with guaranteed functionality of the valve drivers installed in the first functional unit 110, on the other hand, braking intervention is possible at all four wheel brakes by means of the second hydraulic pressure generator 188.

The significant difference between the brake systems 1100 and 1200 consists in the fact that in the brake system 1100, three fluid paths are provided between the first functional unit 110 and the second functional unit 120, while in the brake system 1200 only two such fluid paths have to be present. Specifically the fluid path 1102 included in FIG. 11 can be omitted in the brake system 1200. A separate fluid path could naturally also be provided for each of the two rear wheel brakes HL, HR. In this case the hydraulic assembly representing the rear wheel brakes HL, HR in the second functional unit 120 could simply be "mirrored" (wherein only a single pump piston 804 could then be associated with each of these two hydraulic assemblies).

A six-piston pump is again used in the brake systems 1100 and 1200, wherein a separate set of two pump pistons 804 is associated with each of the two front wheel brakes VL, VR, while a third set of two pump pistons 804 is associated with the two rear wheel brakes HL, HR. Each of these two piston pairs could naturally be replaced by a single piston 804 in the case of a three-piston pump. It should be pointed out again that the piston accumulator 702 could also be omitted or replaced by the pressure accumulator 402 shown in FIG. 4. The bypass valves 502 could also be omitted.

In the event of a failure of the first functional unit 110, by which also the valve drivers for the valves installed in the first functional unit 110 are affected, a build-up of braking pressure can still take place at the two front wheel brakes VL, VR by means of the second functional unit 120. In operation of the second braking pressure generator 188, the pump pistons 804 associated with the rear wheel brakes HL, HR are only running empty. To this end the valve 1104 arranged upstream of the piston accumulator 702 in the hydraulic path 1102 is opened, so that the inputs associated with the corresponding pump pistons 804 are short-circuited to the corresponding outputs. In the exemplary embodiment, the valve 1104 is an electromagnetically actuated 2/2-way valve, which assumes the basic position depicted in FIG. 11 in the unactuated, thus electrically non-actuated state. Basic position here means that the valve 1104 is in a throughflow position.

In the event only of partial failure of the first functional unit 110, by which only a motor control of the first hydraulic pressure generator 132 but not the remaining electronics of the first functional unit 110 (including the valve drivers) is affected, for example, a build-up of braking pressure (and in particular braking pressure regulation) can take place by means of the second hydraulic pressure generator 188 at the two rear wheel brakes HL, HR also, on the other hand. To do this, the valves 174 and 170' associated with the front wheel brakes VL, VR, the valve 156 associated with the simulator 160 and the valve 166 arranged between the master cylinder 148 and the reservoir 122 are actuated in the first functional unit 110 and are thus closed. The other valves installed in the first functional unit 110, in particular the valves 170, 176, 172' and 174', can remain in their basic position depicted in FIG. 11, on the other hand. Furthermore, the valve 1104 is closed, in order to build up a hydraulic pressure at the right rear wheel brake HR via the pump pistons 804 associated with the two rear wheel brakes HL, HR and also at the left rear wheel brake HL via the primary chamber and secondary chamber of the master cylinder 148.

As shown in FIG. 12, the number of connection lines between the first functional unit 110 and the second functional unit 120 can be reduced to just two lines. Another shut-off valve 1204 is then provided in the second functional unit 120. The valve 1204, which is formed in the exemplary embodiment as an electromagnetically actuated 2/2-way valve, assumes the basic position depicted in FIG. 12 (i.e. its throughflow position) in the unactuated, thus electrically non-actuated state.

If a hydraulic pressure is to be generated by means of the hydraulic pressure generator 188 at the rear wheel brakes HL, HR, the valve 1204 is moved to its closed position, so that during a pressure build-up using the pump pistons 804 associated with the rear wheel brakes HL, HR, no return flow of the hydraulic fluid to the corresponding storage piston 702 or into other areas of the second functional unit 120 is permitted. If the control electronics of the first functional unit 110 are otherwise intact, the input path signal is still also available (cf. sensor 182 in FIG. 1). It is therefore possible to react significantly earlier on braking by the driver when the second functional unit 120 is activated than in the case of a complete failure with an intervention only at the two front wheel brakes VL, VR, in which reference can only be made to the signal of the pressure sensor 806 installed in the second functional unit 120.

For service ventilation of the third pump block associated with the two rear wheel brakes HL, HR, the second functional unit 120 can provided with a bleed screw at a suitable point. In addition or alternatively to this, a suitable ventilation routine can be provided, which enables an interaction between the first hydraulic pressure generator 132 and the storage piston 702 (or other volume accumulator) associated with this pump block. Ventilation can take place in this way also via the bleed screw of the nearest rear wheel or front wheel brake.

The redundancy created by the second functional unit 120 generally offers a safety improvement, which makes the brake systems 100-1200 presented here suitable even for applications of autonomous or semi-autonomous driving (e.g. in an RCP mode), for example. In particular, in the event of failure of the first functional unit 110 and a failure to materialise of driver intervention at the (optional) brake pedal 130, the vehicle can still always be brought safely to a stop by means of the second functional unit 120, thus including any braking pressure regulation that may be required.

An exemplary embodiment of an operating method for the brake systems 100-1200 comprises the step of identifying a requirement for braking pressure regulation by means of the second functional unit 120 if there is a lack of functionality of the first functional unit 110. Upon this identification, braking pressure regulation is then carried out by the second functional unit 120 at least at one of the two wheel brakes VL or VR.

Thus in the event of failure of a separate energy supply for the first functional unit 110 (in particular for the electrical pressure generator 132), a lack of functionality of the first functional unit 110 can be recognised. If the requirement for braking pressure regulation at one of the wheel brakes VL and VR is identified in this state (e.g. the necessity of ESC intervention), this then takes place by means of the second functional unit 120, for which a separate energy supply is provided.

In a further example, the failure of the first functional unit 110 (e.g. a mechanical failure of the transmission 142 of the pressure generator 132) can lead to the vehicle having to be braked to a stop immediately. If ABS regulation becomes necessary during this braking, this is taken over by the second functional unit 120.

It is understood that many other scenarios exist in which the vehicle brake systems presented here can be used in an advantageous manner. It is also understood that the test method described in connection with the first exemplary embodiment can be used in any case for the purpose of testing the hydraulic pressure build-up with regard to the other exemplary embodiments also, as a corresponding pressure sensor in the area of the second functional unit 120 and the possibility of uncoupling this functional unit 120 from the first functional unit 110 are present there also.

The invention claimed is:

1. Hydraulic motor vehicle brake system (100-600) with redundant braking pressure regulation, comprising:
   a first functional unit (110) with at least one first electrical braking pressure generator (132), which is formed to generate a braking pressure at each of a plurality of wheel brakes (VL, VR, HL, HR);

a first valve arrangement (174, 176) per wheel brake (VL), wherein the first valve arrangement (174, 176) can be actuated for braking pressure regulation at the corresponding wheel brake (VL), in order to couple a wheel brake (VL) associated with the first valve arrangement (174, 176) selectively to the first braking pressure generator (132) or a first unpressurised reservoir (122) for hydraulic fluid; and a second functional unit (120) with at least one second electrical braking pressure generator (188), which is formed to generate a braking pressure at each of a subset of the wheel brakes (VL, VR), wherein an output of the second braking pressure generator (188) is arranged downstream, as seen from the first braking pressure generator (132), of the first valve arrangement (174, 176) associated with the corresponding wheel brake (VL);

wherein the second functional unit (120) is designed to carry out braking pressure regulation at each wheel brake (VL, VR) of the subset in a redundant manner in relation to the first functional unit (110);

wherein the second functional unit (120) comprises at least one fluid reservoir (214, 402, 702) provided on the input side of the second braking pressure generator (188); wherein the fluid reservoir is formed as a piston accumulator (702) with a cylinder (704) and a piston (706) taken up movably therein, wherein the piston (706) has a storage position when the cylinder (704) is filled and wherein the piston accumulator (702) is arranged in a fluid path between one of the wheel brakes of the subset and the first functional unit (110) in such a way that a hydraulic fluid flowing from the wheel brake in the direction of the first functional unit (110) is able to push the piston (706) into its storage position; and wherein a first non-return valve (708) is provided between the cylinder (704) and the first functional unit (110), which permits a flow of hydraulic fluid from the cylinder (704) into the first functional unit (110), wherein the first non-return valve (708) acts in a blocking manner in the opposite direction.

2. Motor vehicle brake system according to claim 1, wherein both an input of the first braking pressure generator (132) and an input of the second braking pressure generator (188) are or can be coupled to the first unpressurised reservoir.

3. Motor vehicle brake system according to claim 1, wherein the second functional unit (110) comprises a second unpressurised reservoir (124) for hydraulic fluid and an input of the second braking pressure generator (188) is or can be coupled to the second unpressurised reservoir (124); and wherein an input of the first braking pressure generator (132) is or can be coupled to the first unpressurised reservoir (122).

4. Motor vehicle brake system according to claim 3, wherein the second valve arrangement (198) is provided between the output of the second braking pressure generator (188) and the second unpressurised reservoir (124).

5. Motor vehicle brake system according to claim 1, wherein the second functional unit (120) further comprises a second valve arrangement (198, 210, 214, 216, 212, 302, 502) per wheel brake (VL) of the subset for carrying out braking pressure regulation, wherein the second valve arrangement (198, 210, 214, 216, 212, 302, 502) can be actuated for braking pressure regulation at the corresponding wheel brake (VL).

6. Motor vehicle brake system according to claim 5, wherein the second valve arrangement comprises a first valve unit (216), in order to couple the wheel brake (VL) associated with the second valve arrangement selectively to the second pressure generator (188) to increase the braking pressure, and a second valve unit (218), in order to selectively reduce braking pressure at the wheel brake (VL) associated with the second valve arrangement.

7. Motor vehicle brake system according to claim 5, wherein 40 the second electrical braking pressure generator (188) is arranged in a fluid line between the first valve arrangement (174, 176) associated with a wheel brake (VL) and the corresponding wheel brake (VL) in such a way that the output of the second braking pressure generator (188) is directed towards the wheel brake (VL) and an input or the input of the second braking pressure generator (188) is directed towards the corresponding first valve arrangement (174, 176).

8. Motor vehicle brake system according to claim 7, wherein the second valve arrangement associated with the corresponding wheel brake (VL) comprises a first valve unit (302) connected parallel to the second braking pressure generator (188).

9. Motor vehicle brake system according to claim 8, wherein the second valve arrangement associated with the corresponding wheel brake (VL) comprises a second valve unit (502) connected parallel to the first valve unit (302).

10. Motor vehicle brake system according to claim 8, wherein the first and, if present, the second valve unit (302, 502) is designed to assume a forward position in operation of the first braking pressure generator (132) or, in operation of the second braking pressure generator (188), to assume a blocking position at least opposite to a conveying direction of the second braking pressure generator (188).

11. Motor vehicle brake system according to claim 1, wherein the wheel brakes comprise front wheel brakes (VL, VR) and rear wheel brakes (HL, HR), wherein the front wheel brakes (VL, VR) are connected to the second functional unit (120) and the rear wheel brakes (HR, HL) are connected to the first functional unit (110).

12. Motor vehicle brake system according to claim 1, wherein the first non-return valve (708) is spring-loaded, wherein an opening pressure for opening the first non-return valve (708) is less than 1 bar.

13. Motor vehicle brake system according to claim 1, wherein a second non-return valve (710) is provided, which permits an aspiration of hydraulic fluid by means of the second braking pressure generator (188) from or via the first functional unit (110), wherein the second non-return valve (710) acts in a blocking manner in the opposite direction.

14. Motor vehicle brake system according to claim 1, wherein the piston accumulator (702) is formed without an elastic element for automatic transfer of the piston (704) to its storage position.

15. Motor vehicle brake system according to claim 1, wherein the second functional unit (120) further comprises a separating piston arrangement (194) between the output of the second braking pressure generator (188) and the corresponding wheel brake (VL) of the subset.

16. Motor vehicle brake system according to claim 15, wherein the separating piston arrangement (194) is formed to couple the first braking pressure generator (132) in its operation fluidically to the corresponding wheel brake (VL)

of the subset and in operation of the second braking pressure generator (188) to uncouple the first braking pressure generator (132) fluidically from the corresponding wheel brake.

17. Motor vehicle brake system according to claim 1, wherein the first functional unit (110) further comprises a first control device (180) for actuation of the first braking pressure generator (132) in braking pressure regulation of the first functional unit (110) and the second functional unit (120) further comprises a second control device (180') for actuation of the second braking pressure generator (188) in braking pressure regulation of the second functional unit (120).

18. Motor vehicle brake system according to claim 1, wherein each first valve arrangement (174, 176) comprises a third valve unit (174), in order to couple the wheel brake (VL) associated with the first valve arrangement (174, 176) selectively to the first braking pressure generator (132), and a fourth valve unit (176), in order selectively to reduce braking pressure at the wheel brake (VL) associated with the second valve arrangement.

19. Motor vehicle brake system according to claim 1, wherein the first functional unit (110) further comprises:
 a master cylinder (148) that can be coupled to a brake pedal (130); and
 a changeover device (152, 154), in order selectively to couple the first braking pressure generator (132) or the master cylinder (148) to at least one of the wheel brakes (VL, VR, HL, HR).

20. Motor vehicle brake system according to claim 1, wherein the subset of the wheel brakes (VL, VR) is associated exclusively with the front wheels of the motor vehicle.

21. Motor vehicle brake system according to claim 1, wherein the first braking pressure generator (132) comprises a double-acting cylinder-piston arrangement (134) actuatable by means of an electric motor (140).

22. Motor vehicle brake system according to claim 1, wherein the second functional unit (120) is formed in such a way that the second braking pressure generator (188) can implement a build-up of braking pressure at all wheel brakes of the motor vehicle.

23. Motor vehicle brake system according to claim 1, wherein the second braking pressure generator (188) comprises a multi-piston pump, wherein at least one piston (804) of the multi-piston pump (802) is associated with each of the wheel brakes.

24. Motor vehicle brake system according to claim 23, wherein the multi-piston pump comprises at least four pistons (804) and the brake system comprises two front wheel brakes (VL, VR) and two rear wheel brakes (HL, HR), wherein at least one piston (804) is associated with each front wheel brake (VL, VR) and each rear wheel brake (HL, HR).

25. Motor vehicle brake system according to claim 24, wherein the two front wheel brakes (VL, VR) and the two rear wheel brakes (HL, HR) are connected to the second functional unit (120).

26. Motor vehicle brake system according to claim 23, wherein the multi-piston pump comprises at least three pistons (804) and the brake system comprises two front wheel brakes (VL, VR) and two rear wheel brakes (HL, HR), wherein at least one piston (804) is associated with each front wheel brake (VL, VR) and wherein at least one piston (804) is associated jointly with the two rear wheel brakes (HL, HR).

27. Motor vehicle brake system according to claim 26, wherein the two front wheel brakes (VL, VR) are connected to the second functional unit (120) and the two rear wheel brakes (HL, HR) are connected to the first functional unit (110).

28. Motor vehicle brake system according to claim 1, wherein a separate fluid path extending between the first functional unit (110) and the second functional unit (120) is provided per wheel brake.

29. Motor vehicle brake system according to claim 1, wherein the wheel brakes comprise front wheel brakes (VL, VR) and rear wheel brakes (HL, HR), wherein the front wheel brakes (VL, VR) are connected to the second functional unit (120) and the rear wheel brakes (HL, HR) are connected to the first functional unit (110); and wherein a separate fluid path extending between the first functional unit (110) and the second functional unit (120) is provided per front wheel brake (VL, VR) and for the rear wheel brakes (HL, HR) a common fluid path extending between the first functional unit (110) and the second functional unit is provided.

30. Motor vehicle brake system according to claim 1, wherein the wheel brakes comprise front wheel brakes (VL, VR) and rear wheel brakes (HL, HR), wherein the front wheel brakes (VL, VR) are connected to the second functional unit (120) and the rear wheel brakes (HL, HR) are connected to the first functional unit (110); and wherein a separate fluid path extending between the first functional unit (110) and the second functional unit (120) is provided per front wheel brake (VL, VR) and wherein the at least one piston (804) associated commonly with the two rear wheel brakes (HL, HR) is able to convey hydraulic fluid to the first functional unit (110) in at least one of these fluid paths.

31. Method for operating a hydraulic motor vehicle brake system (100-600) according to claim 1, wherein the method comprises the following steps:
 identification of a requirement for braking pressure regulation in the event of a lack of functionality of the first functional unit (110);
 on identification, carrying out braking pressure regulation by the second functional unit (120) at least at one wheel brake (VL, VR) of the subset; and
 pushing the piston (706) into its storage position by means of hydraulic fluid flowing from the wheel brake in the direction of the first functional unit (110) until the non-return valve (708) permits a flow of hydraulic fluid from the cylinder into the first functional unit (110).

32. Motor vehicle control device (180 or 180') or control device system (180, 180'), wherein the control device or control device system has at least one processor and at least one memory and wherein the memory comprises program code which, when it is executed by the processor, causes the execution of the steps of the method according to claim 31.

33. Method for testing the second functional unit (120) of the electrohydraulic motor vehicle brake system (100-600) according to claim 1, comprising the steps:
 hydraulic uncoupling of the second functional unit (120) from the first functional unit (110);
 actuation of the second pressure generator (188) to build up a hydraulic pressure at least at one wheel brake (VL, VR) of the subset;
 determination of one or more of the following parameters:
  a hydraulic pressure generated at the corresponding wheel brake (VL, VR) and a filling level of an unpressurised reservoir (124) for hydraulic fluid associated with the second functional unit (120);

testing of the functionality of the second functional unit (120) on the basis of the at least one parameter determined.

\* \* \* \* \*